(12) United States Patent
Nishi et al.

(10) Patent No.: US 7,602,440 B2
(45) Date of Patent: Oct. 13, 2009

(54) IMAGE PROCESSING APPARATUS AND METHOD, RECORDING MEDIUM, AND PROGRAM

(75) Inventors: Toru Nishi, Tokyo (JP); Kazuhiko Ueda, Kanagawa (JP); Mitsuyasu Asano, Tokyo (JP)

(73) Assignee: Sony Corporation, Tokyo (JP)

( * ) Notice: Subject to any disclaimer, the term of this patent is extended or adjusted under 35 U.S.C. 154(b) by 622 days.

(21) Appl. No.: 10/572,803

(22) PCT Filed: Jul. 6, 2005

(86) PCT No.: PCT/JP2005/012469

§ 371 (c)(1),
(2), (4) Date: Mar. 22, 2006

(87) PCT Pub. No.: WO2006/016454

PCT Pub. Date: Feb. 16, 2006

(65) Prior Publication Data

US 2007/0070221 A1    Mar. 29, 2007

(30) Foreign Application Priority Data

Aug. 11, 2004 (JP) ............... P2004-234051
Jun. 2, 2005 (JP) ............... P2005-162586

(51) Int. Cl.
*H04N 5/217* (2006.01)
*H04N 7/01* (2006.01)

(52) U.S. Cl. ............ 348/441; 348/241; 348/458; 348/459; 348/497; 348/607

(58) Field of Classification Search ........... 348/241, 348/441, 458, 459, 497, 607
See application file for complete search history.

(56) References Cited

U.S. PATENT DOCUMENTS

| | | | | |
|---|---|---|---|---|
| 5,343,241 A | * | 8/1994 | Richards et al. | 348/97 |
| 5,444,491 A | * | 8/1995 | Lim | 348/441 |
| 5,739,894 A | * | 4/1998 | Weisgerber | 352/46 |
| 6,111,610 A | * | 8/2000 | Faroudja | 348/441 |
| 6,330,344 B1 | * | 12/2001 | Kondo et al. | 382/107 |

(Continued)

FOREIGN PATENT DOCUMENTS

EP     0 874 523     10/1998

(Continued)

OTHER PUBLICATIONS

International Search Report mailed Aug. 16, 2005.

(Continued)

*Primary Examiner*—Brian P Yenke
(74) *Attorney, Agent, or Firm*—Rader, Fishman & Grauer PLLC; Christopher M. Tobin

(57) ABSTRACT

The present invention relates to an image processing apparatus and method, a recording medium, and a program that can very sharply display video images which are subjected to frame rate conversion by suppressing a decrease in the image quality (blurred images) caused by imaging blur. A high frame converter 11 performs high frame rate conversion on an input moving picture. An imaging blur suppression processor 13 corrects each pixel value forming a subject frame based on at least one value corresponding to the subject frame of the parameter values representing imaging blur detected by an imaging blur characteristic detector 12. Accordingly, a moving picture having a higher rate than that of the input moving picture and having each pixel value suitably corrected to suppress imaging blur is output. The present invention is applicable to a television system.

36 Claims, 15 Drawing Sheets

U.S. PATENT DOCUMENTS

| | | | |
|---|---|---|---|
| 6,462,785 B1* | 10/2002 | Carraro et al. | 348/578 |
| 7,061,537 B2* | 6/2006 | Lee et al. | 348/447 |
| 7,324,160 B2* | 1/2008 | Yang | 348/542 |
| 7,365,801 B2* | 4/2008 | Kondo | 348/620 |
| 7,388,603 B2* | 6/2008 | Cheung et al. | 348/208.14 |
| 7,423,691 B2* | 9/2008 | Orlick et al. | 348/448 |
| 7,428,019 B2* | 9/2008 | Irani et al. | 348/581 |
| 7,443,448 B2* | 10/2008 | Yang et al. | 348/441 |
| 7,474,316 B2* | 1/2009 | Daly | 345/596 |
| 7,489,350 B2* | 2/2009 | De Haan et al. | 348/252 |
| 2001/0048475 A1* | 12/2001 | Shiomi | 348/208 |
| 2005/0225670 A1* | 10/2005 | Wexler et al. | 348/441 |
| 2005/0254011 A1* | 11/2005 | Weisgerber | 352/84 |
| 2006/0061690 A1* | 3/2006 | De Haan et al. | 348/625 |
| 2007/0040918 A1* | 2/2007 | Kondo et al. | 348/241 |

FOREIGN PATENT DOCUMENTS

| | | |
|---|---|---|
| JP | 06-0463211 | 2/1994 |
| JP | 07-059054 | 3/1995 |
| JP | 11-168703 | 6/1999 |
| JP | 2001-078075 | 3/2001 |
| JP | 2005-148521 | 6/2005 |

OTHER PUBLICATIONS

International Written Opinion mailed Aug. 16, 2005.

Notification of Transmittal of Copies of Translation of the International Preliminary Report on Patentability (PCT/IB/338; 373 and PCT/ISA/237; International Application.: PCT/JP2005/012469; Dated: Jul. 6, 2005.

* cited by examiner

IMAGE PROCESSING APPARATUS AND METHOD, RECORDING MEDIUM, AND PROGRAM

TECHNICAL FIELD

The present invention relates to image processing apparatuses and methods, recording media, and programs, and more particularly, to an image processing apparatus and method, a recording medium, and a program that can very sharply display video images which are subjected to frame rate conversion by suppressing a decrease in the image quality (blurred images) due to blurring caused by an imaging operation.

BACKGROUND ART

Recently, in video signal conversion apparatuses for displaying video images (moving pictures), as a method for displaying video images without decreasing the image quality even if there is no constant synchronizing relationship of the frame frequency or the field frequency between the television system of an input side and the television system of an output side, a frame rate adjusting method (hereinafter referred to as a "frame rate conversion method") is considered (see Patent Document 1).

[Patent Document 1] Japanese Unexamined Patent Application Publication No. 7-59054

DISCLOSURE OF INVENTION

Problems to be Solved by the Invention

However, an improvement in the frame rate by utilizing a known frame rate conversion method, such as that disclosed in Patent Document 1, is made without considering motion blurring caused by an imaging operation (hereinafter referred to as "imaging blur"). Accordingly, a decrease in the image quality (blurred images) caused by imaging blur remains without being particularly improved, and it is thus difficult to display sharp video images on display devices.

In view of the above background, it is an object of the present invention to very sharply display video images which are subjected to frame rate conversion by suppressing a decrease in the image quality (blurred images) caused by imaging blur.

Means for Solving the Problems

A first image processing apparatus of the present invention is an image processing apparatus for processing a moving picture photographed by a predetermined photographing device on the basis of access units. The first image processing apparatus includes: high rate conversion means for executing high rate conversion processing for converting a rate of the access units of the moving picture from a current first rate into a second rate, which is higher than the first rate; detection means for detecting, for each of the plurality of access units forming the moving picture, at least one parameter value representing a characteristic of imaging blur occurring when the photographing device photographs the moving picture; and correction means for correcting, before or after the high rate conversion processing executed by the high rate conversion means, each pixel value forming each subject access unit of the moving picture based on at least one value corresponding to the subject access unit of the parameter values detected by the detection means.

The high rate conversion means may execute the high rate conversion processing by using the parameter values detected by the detection means.

The first rate may be the rate of the access units when the moving picture is photographed by the photographing device.

For each of the plurality of access units forming the moving picture, the detection means may detect a motion vector of at least one pixel of the pixels forming each subject access unit as the parameter value.

As at least part of the high rate conversion processing, the high rate conversion means may execute motion-compensation frame interpolation processing by using the motion vectors detected by the detection means.

The detection means may detect, as the parameter value, a shutter speed of the photographing device when each of the plurality of access units forming the moving picture is photographed by the photographing device.

For each of the plurality of access units forming the moving picture, the correction means may set a subject pixel of the pixels forming the subject access unit as a focused pixel. The correction means may include: filter characteristic conversion means for converting a characteristic of a low-pass filter indicating the imaging blur in accordance with the value corresponding to the focused pixel of at least one parameter value detected by the detection means; inverse filter generating means for generating an inverse filter of the low-pass filter whose characteristic is converted by the filter characteristic conversion means; and filtering means for correcting the pixel value of the focused pixel by applying the inverse filter generated by the inverse filter generating means to a predetermined block containing the focused pixel of the subject access unit.

For each of the plurality of access units forming the moving picture, the correction means may set a subject pixel of the pixels forming the subject access unit as a focused pixel. The correction means may include: filter characteristic conversion means for converting a characteristic of a low-pass filter indicating the imaging blur in accordance with the value corresponding to the focused pixel of at least one parameter value detected by the detection means; filtering means for applying the low-pass filter whose characteristic is converted by the filter characteristic conversion means to a predetermined block containing the focused pixel of the subject access unit to output a corrected pixel value of the focused pixel as a first value; subtraction means for computing a difference between a pixel value of the focused pixel before being corrected and the first value output from the filtering means to output the resulting difference as a second value; and addition means for adding the second value output from the subtraction means to the pixel value of the focused pixel before being corrected to output a resulting addition value as the pixel value of the focused pixel after being corrected.

For each of the plurality of access units forming the moving picture, the correction means may set a subject pixel of the pixels forming the subject access unit as a focused pixel. The correction means may include: first delay means for sequentially receiving a first image signal corresponding to a pixel group of the subject access unit in which pixels including the focused pixel are continuously located in a predetermined direction and for delaying the received first image signal by a first delay time corresponding to N pixels (N is an integer of one or greater) to output a resulting second image signal; second delay means for sequentially receiving the second image signal output from the first delay means and for delaying the received second image signal by a second delay time corresponding to M pixels (M is an integer of one or greater including N) to output a resulting third image signal; pixel value correcting means for correcting the pixel value of the focused pixel by using the first image signal input into the first delay means, the second image signal output from the first delay means and input into the second delay means, and the third image signal output from the second delay means; and delay time changing means for changing the first delay time of the first delay means and the second delay time of the second delay means in accordance with a value corresponding to the focused pixel of the parameter values detected by the detection means.

The first rate may be 30 Hz and the second rate may be 120 Hz.

The first rate may be 60 Hz and the second rate may be 120 Hz.

The first rate may be 60 Hz and the second rate may be 240 Hz.

The first rate may be 50 Hz and the second rate may be 100 Hz.

The first rate may be 50 Hz and the second rate may be 200 Hz.

An image processing method for the first image processing apparatus of the present invention is an image processing method for an image processing apparatus for processing a moving picture photographed by a predetermined photographing device on the basis of access units. The image processing method includes: a high rate conversion step of executing high rate conversion processing for converting a rate of the access units of the moving picture from a current first rate into a second rate, which is higher than the first rate; a detection step of detecting, for each of the plurality of access units forming the moving picture, at least one parameter value representing a characteristic of imaging blur occurring when the photographing device photographs the moving picture; and a correction step of correcting, before or after the high rate conversion processing executed in the high rate conversion step, each pixel value forming each subject access unit of the moving picture based on at least one value corresponding to the subject access unit of the parameter values detected by processing in the detection step.

The high rate conversion step may be the step of executing the high rate conversion processing by using the parameter values detected by processing in the detection step.

The first rate may be the rate of the access units when the moving picture is photographed by the photographing device.

For each of the plurality of access units forming the moving picture, the detection step may include processing for detecting a motion vector of at least one pixel of the pixels forming each subject access unit as the parameter value.

The high rate conversion step may be the step of executing motion-compensation frame interpolation processing as at least part of the high rate conversion processing by using the motion vectors detected by processing in the detection step.

The detection step may include processing for detecting, as the parameter value, a shutter speed of the photographing device when each of the plurality of access units forming the moving picture is photographed by the photographing device.

For each of the plurality of access units forming the moving picture, the correction step may set a subject pixel of the pixels forming the subject access unit as a focused pixel. The steps for the focused pixel may include: a filter characteristic conversion step of converting a characteristic of a low-pass filter indicating the imaging blur in accordance with the value corresponding to the focused pixel of at least one parameter value detected by processing in the detection step; an inverse filter generating step of generating an inverse filter of the low-pass filter whose characteristic is converted by processing in the filter characteristic conversion step; and a filtering step of correcting the pixel value of the focused pixel by applying the inverse filter generated by processing in the inverse filter generating step to a predetermined block containing the focused pixel of the subject access unit.

For each of the plurality of access units forming the moving picture, the correction step may set a subject pixel of the pixels forming the subject access unit as a focused pixel. The steps for the focused pixel may include: a filter characteristic conversion step of converting a characteristic of a low-pass filter indicating the imaging blur in accordance with the value corresponding to the focused pixel of at least one parameter value detected by processing in the detection step; a filtering step of applying the low-pass filter whose characteristic is converted by processing in the filter characteristic conversion step to a predetermined block containing the focused pixel of the subject access unit to output a corrected pixel value of the focused pixel as a first value; a subtraction step of computing a difference between a pixel value of the focused pixel before being corrected and the first value output as a processing result of the filtering step to output the resulting difference as a second value; and an addition step of adding the second value output as a result of a processing result of the subtraction step to the pixel value of the focused pixel before being corrected to output a resulting addition value as the pixel value of the focused pixel after being corrected.

For each of the plurality of access units forming the moving picture, the correction step may set a subject pixel of the pixels forming the subject access unit as a focused pixel. The steps for the focused pixel may include: a first delay step of sequentially receiving a first image signal corresponding to a pixel group of the subject access unit in which pixels including the focused pixel are continuously located in a predetermined direction and for delaying the received first image signal by a first delay time corresponding to N pixels (N is an integer of one or greater) to output a resulting second image signal; a second delay step of sequentially receiving the second image signal output as a processing result of the first delay step and for delaying the received second image signal by a second delay time corresponding to M pixels (M is an integer of one or greater including N) to output a resulting third image signal; a pixel value correcting step of correcting the pixel value of the focused pixel by using the first image signal input as a subject to be processed in the first delay step, the second image signal output as the processing result of the first delay step and input as a subject to be processed in the second delay step, and the third image signal output as the processing result of the second delay step; and a delay time changing step of changing the first delay time in the first delay step and the second delay time in the second delay step in accordance with a value corresponding to the focused pixel of the parameter values detected by processing in the detection step.

The first rate may be 30 Hz and the second rate may be 120 Hz.

The first rate may be 60 Hz and the second rate may be 120 Hz.

The first rate may be 60 Hz and the second rate may be 240 Hz.

The first rate may be 50 Hz and the second rate may be 100 Hz.

The first rate may be 50 Hz and the second rate may be 200 Hz.

A program of a first recording medium of the present invention is a program to be executed by a computer that controls image processing performed on a moving picture photographed by a predetermined photographing device on the basis of access units. The program includes: a high rate conversion step of executing high rate conversion processing for converting a rate of the access units of the moving picture from a current first rate into a second rate, which is higher than the first rate; a detection step of detecting, for each of the plurality of access units forming the moving picture, at least one parameter value representing a characteristic of imaging blur occurring when the photographing device photographs the moving picture; and a correction step of correcting, before or after the high rate conversion processing executed in the high rate conversion step, each pixel value forming each subject access unit of the moving picture based on at least one value corresponding to the subject access unit of the parameter values detected by processing in the detection step.

A first program of the present invention is a program to be executed by a computer that controls image processing performed on a moving picture photographed by a predetermined photographing device on the basis of access units. The first program includes: a high rate conversion step of executing high rate conversion processing for converting a rate of the access units of the moving picture from a current first rate into a second rate, which is higher than the first rate; a detection step of detecting, for each of the plurality of access units forming the moving picture, at least one parameter value representing a characteristic of imaging blur occurring when the photographing device photographs the moving picture; and a correction step of correcting, before or after the high rate conversion processing executed in the high rate conversion step, each pixel value forming each subject access unit of the moving picture based on at least one value corresponding to the subject access unit of the parameter values detected by processing in the detection step.

According to the first image processing apparatus and method, the first recording medium, and the first program of the present invention, image processing is performed on a moving picture photographed by a predetermined photographing device on the basis of access units. More specifically, high rate conversion processing for converting a rate of the access units of the moving picture from a current first rate into a second rate, which is higher than the first rate, is executed. For each of the plurality of access units forming the moving picture, at least one parameter value representing a characteristic of imaging blur occurring when the photographing device photographs the moving picture is detected. Before or after the high rate conversion processing, each pixel value forming each subject access unit of the moving picture is corrected based on at least one value corresponding to the subject access unit of the detected parameter values.

A second image processing apparatus of the present invention is an image processing apparatus for performing processing on a moving picture photographed by a predetermined photographing device when receiving, from a different image processing apparatus, the moving picture and, for each of a plurality of access units forming the moving picture, at least one parameter value representing a characteristic of imaging blur occurring when the photographing device photographs the moving picture. The second image processing apparatus includes: high rate conversion means for executing high rate conversion processing for converting a rate of the access units of the moving picture supplied from the different image processing apparatus from a current first rate into a second rate, which is higher than the first rate; and correction means for correcting, before or after the high rate conversion processing executed by the high rate conversion means, each pixel value forming each subject access unit of the moving picture supplied from the different image processing apparatus based on at least one value corresponding to the subject access unit of the parameter values supplied from the different image processing apparatus.

The first rate may be 30 Hz and the second rate may be 120 Hz.

The first rate may be 60 Hz and the second rate may be 120 Hz.

The first rate may be 60 Hz and the second rate may be 240 Hz.

The first rate may be 50 Hz and the second rate may be 100 Hz.

The first rate may be 50 Hz and the second rate may be 200 Hz.

An image processing method for the second image processing apparatus is an image processing method for an image processing apparatus for performing processing on a moving picture photographed by a predetermined photographing device when receiving, from a different image processing apparatus, the moving picture and, for each of a plurality of access units forming the moving picture, at least one parameter value representing a characteristic of imaging blur occurring when the photographing device photographs the moving picture. The image processing method includes: a high rate conversion step of executing high rate conversion processing for converting a rate of the access units of the moving picture supplied from the different image processing apparatus from a current first rate into a second rate, which is higher than the first rate; and a correction step of correcting, before or after the high rate conversion processing executed in the high rate conversion step, each pixel value forming each subject access unit of the moving picture supplied from the different image processing apparatus based on at least one value corresponding to the subject access unit of the parameter values supplied from the different image processing apparatus.

The first rate may be 30 Hz and the second rate may be 120 Hz.

The first rate may be 60 Hz and the second rate may be 120 Hz.

The first rate may be 60 Hz and the second rate may be 240 Hz.

The first rate may be 50 Hz and the second rate may be 100 Hz.

The first rate may be 50 Hz and the second rate may be 200 Hz.

A program of a second recording medium of the present invention is a program to be executed by a computer that controls image processing performed on a moving picture photographed by a predetermined photographing device when receiving the moving picture and, for each of a plurality of access units forming the moving picture, at least one parameter value representing a characteristic of imaging blur occurring when the photographing device photographs the moving picture. The program includes: a high rate conversion step of executing high rate conversion processing for converting a rate of the access units of the supplied moving picture from a current first rate into a second rate, which is higher than the first rate; and a correction step of correcting, before or after the high rate conversion processing executed in the high rate conversion step, each pixel value forming each subject access unit of the supplied moving picture based on at least one value corresponding to the subject access unit of the supplied parameter values.

A second program of the present invention is a program to be executed by a computer that controls image processing performed on a moving picture photographed by a predetermined photographing device when receiving the moving picture and, for each of a plurality of access units forming the moving picture, at least one parameter value representing a characteristic of imaging blur occurring when the photographing device photographs the moving picture. The second program includes: a high rate conversion step of executing high rate conversion processing for converting a rate of the access units of the supplied moving picture from a current first rate into a second rate, which is higher than the first rate; and a correction step of correcting, before or after the high rate conversion processing executed in the high rate conversion step, each pixel value forming each subject access unit of the supplied moving picture based on at least one value corresponding to the subject access unit of the supplied parameter values.

According to the second image processing apparatus and method, the second recording medium, and the second program of the present invention, image processing is performed on a moving picture photographed by a predetermined photographing device when receiving the moving picture and, for each of the plurality of access units forming the moving picture, at least one parameter value representing a characteristic of imaging blur occurring when the photographing device photographs the moving picture. More specifically, high rate conversion processing for converting a rate of the access units of the supplied moving picture from a current first rate into a second rate, which is higher than the first rate, is executed. Before or after the high rate conversion processing, each pixel value forming each subject access unit of the supplied moving picture is corrected based on at least one value corresponding to the subject access unit of the supplied parameter values.

Advantages

As is seen from the foregoing description, according to the present invention, the frame rate of a moving picture can be converted into a higher frame rate than that of the input moving picture. In particular, the moving picture after being subjected to frame rate conversion can be displayed very sharply by suppressing a decrease in the image quality (blurred images) caused by imaging blur.

Figure 1:
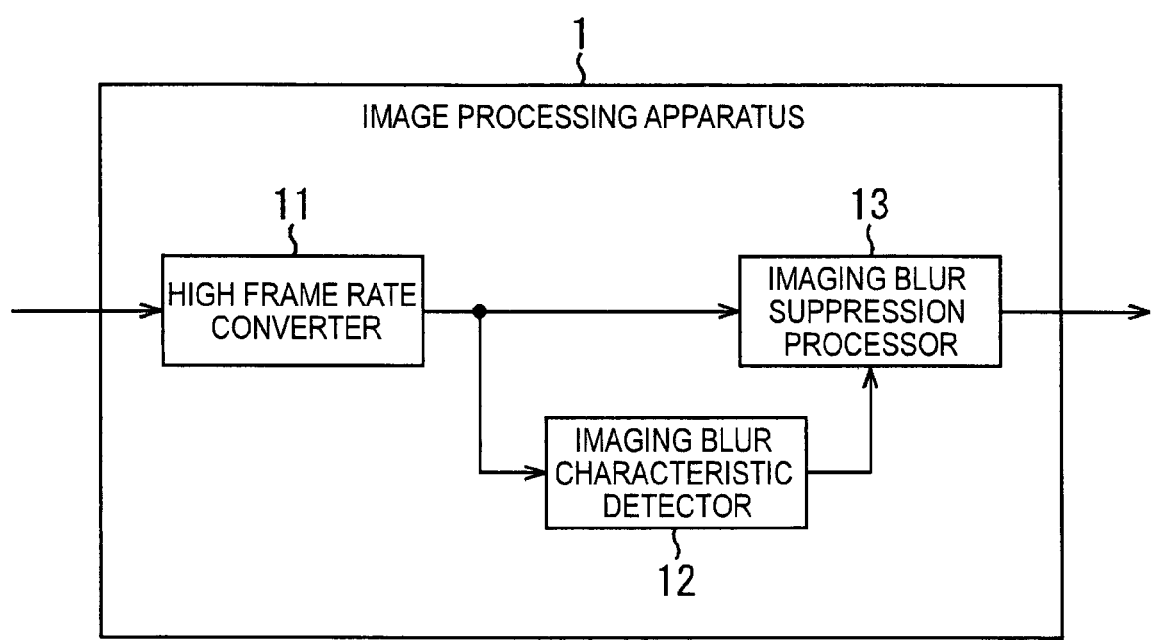
FIG. 1 is a block diagram illustrating an example of the functional configuration of an image processing apparatus to which the present invention is applied.

REFERENCE NUMERALS 1 image processing apparatus, 11 high frame rate converter, 12 imaging blur characteristic detector, 13 imaging blur suppression processor, 21 moving average filter (low-pass filter) characteristic converter, 22 inverse moving average filter (high-pass filter) generator, 23 inverse moving average filter (high-pass filter), 31 moving average filter (low-pass filter) characteristic converter, 32 moving average filter (low-pass filter), 33 adder, 34 adder, 51 input unit, 52 variable DL unit, 53 variable DL unit, 54-1, 54-2 correcting units, 55 delay time changing unit, 56 output unit, 101, 102, 112, 131 image processing apparatuses, 201 CPU, 202 ROM, 203 RAM, 208 storage unit, 211 removable recording medium.

BEST MODE FOR CARRYING OUT THE INVENTION

An embodiment of the present invention is described below with reference to the drawings.

FIG. 1 illustrates an example of the functional configuration of an image processing apparatus to which the present invention is applied.

An image processing apparatus 1 executes various image processing operations on moving picture data on the basis of access units. The access units are units of moving pictures, such as frames or fields, and more specifically, the entirety or part of each frame (still image) forming moving pictures. For the convenience of description, it is assumed that the image processing apparatus 1 executes various image processing operations on moving picture data in units of frames.

The image processing apparatus 1 includes, as shown in FIG. 1, a high frame rate converter 11, an imaging blur characteristic detector 12, and an imaging blur suppression processor 13.

For example, moving picture signals, such as television broadcast signals, are input into the high frame rate converter 11 as moving picture data in units of frames.

Hereinafter, moving pictures and the corresponding moving picture data are collectively referred to as "moving pictures" unless it is necessary to individually distinguish them. Similarly, frames and the corresponding frame data are collectively referred to as "frames" unless it is necessary to individually distinguish them.

When a moving picture having a first frame rate is input, the high frame rate converter 11 performs high frame rate conversion processing on the input moving picture, and supplies the resulting moving picture having a second frame rate, which is higher than the first frame rate, to the imaging blur characteristic detector 12 and the imaging blur suppression processor 13.

The high frame rate conversion processing is executed when the first frame rate of an input moving picture is lower than the second frame rate of an output (displayed) moving picture. The high frame rate conversion processing is used for converting the first frame rate into the second frame rate, which is higher than the first frame rate, by creating and inserting a new frame between adjacent frames of the input moving picture.

The first frame rate is a frame rate when the moving picture is input into the high frame rate converter 11. Accordingly, the first frame rate can be any frame rate, and it is assumed here that the first frame rate is a frame rate of the moving picture when it is captured by an imaging device (not shown), i.e., the first frame rate is an imaging frame rate.

The imaging blur characteristic detector 12 detects a parameter value representing a characteristic of the imaging blur for each frame of the moving picture supplied from the high frame rate converter 11. A detection result of the imaging blur characteristic detector 12, i.e., the parameter value representing a characteristic of the imaging blur, is supplied to the imaging blur suppression processor 13.

The parameter representing a characteristic of the imaging blur is not particularly restricted, and various parameters may be used. Specific examples of parameters indicating characteristics of imaging blur are given below.

The number of parameter values to be detected indicating the characteristics of imaging blur in one frame is not particularly restricted. For example, only one parameter value indicating a characteristic of the imaging blur may be detected for each frame, or one parameter value indicating a characteristic of the imaging blur may be detected for each pixel forming the frame. Alternatively, the frame may be divided into several blocks, and one parameter value indicating a characteristic of the imaging blur may be detected for each block.

The imaging blur suppression processor 13 corrects each pixel value forming a subject frame of the moving picture supplied from the high frame rate converter 11 based on the parameter value of the subject frame selected from the parameter values detected by the imaging blur characteristic detector 12. That is, the imaging blur suppression processor 13 corrects each pixel value forming the subject frame in accordance with the characteristic (parameter value) of the imaging blur of the subject frame so that the imaging blur can be suppressed.

Accordingly, the moving picture subjected to imaging blur suppression by correcting each pixel value forming each frame after being converted into the second frame rate, which is higher than the first frame rate of the input moving picture, is output to the outside of the image processing apparatus 1 from the imaging blur suppression processor 13.

In the example shown in FIG. 1, a set of the imaging blur characteristic detector 12 and the imaging blur suppression processor 13 is used with the high frame rate converter 11. However, a set the imaging blur characteristic detector 12 and the imaging blur suppression processor 13 may be used singly, or may be used in combination with another block (another image processor performing predetermined image processing) (not shown).

That is, imaging blur can be advantageously suppressed by using only a set of the imaging blur characteristic detector 12 and the imaging blur suppression processor 13. To make this advantage more noticeable, it is preferable, as stated above, that a set of the imaging blur characteristic detector 12 and the imaging blur suppression processor 13 be combined with the high frame rate converter 11. The reason for this is discussed below.

When a moving picture displayed on a display device (not shown) is formed as an image on a human's retina, a blur recognized by that person is a combination of hold-type blurring caused by tracing a moving object contained in the moving picture by that person and the above-described imaging blur caused by an imaging operation.

The characteristics of imaging blur can be represented by a low-pass filter, as discussed below with reference to FIG. 4. That is, an image signal after the occurrence of imaging blur is equivalent to an image signal before the occurrence of imaging blur (ideal signal) after passing through a low-pass filter. Accordingly, the frequency characteristics of the image signal after the occurrence of imaging blur are lower than those of the image signal before the occurrence of imaging blur. That is, basically, as the frequency of the image signal after the occurrence of imaging blur becomes higher, the gain of the image signal becomes lower, compared to the image signal before the occurrence of imaging blur.

The characteristics of hold-type blurring can also be represented by a low-pass filter, as in the characteristics of imaging blur. That is, an image signal after the occurrence of hold-type blurring is equivalent to an image signal before the occurrence of hold-type blurring (image signal after the occurrence of imaging blur) after passing through a low-pass filter. Accordingly, the frequency characteristics of the image signal after the occurrence of hold-type blurring are lower than those of the image signal before the occurrence of hold-type blurring. That is, basically, as the frequency of the image signal after the occurrence of hold-type blurring becomes higher, the gain of the image signal becomes lower, compared to the image signal before the occurrence of hold-type blurring. It should be noted that the hold-type blurring occurs only when a display device is a fixed-pixel (hold)-type display device.

Thus, hold-type blurring could be suppressed by performing high frame rate conversion processing on an image signal having low frequency characteristics after the occurrence of imaging blur. However, even such high frame rate conversion processing cannot decrease the imaging blur, and the effect of suppressing blurring on a human's retina is halved. This is described below with reference to FIG. 2.

Figure 2:
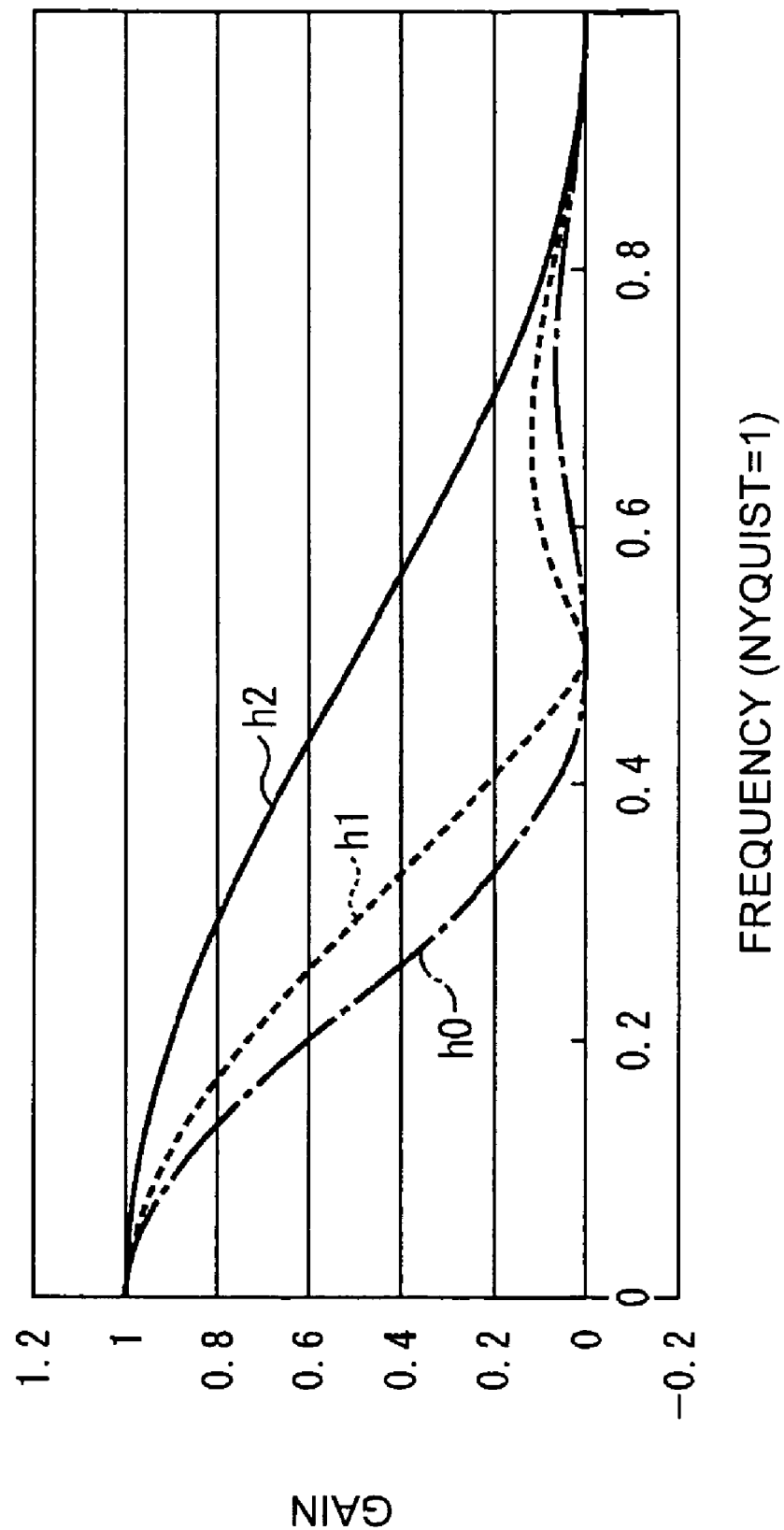
FIG. 2 illustrates the frequency characteristics of blurring of an image formed on a human's retina.

FIG. 2 illustrates the frequency characteristics of blurring of an image formed on a human's retina when a real object moving at a rate of 4 (pixel/frame) is photographed within a photographing range of a photographing device (hereinafter referred to as a "camera"). In FIG. 2, the horizontal axis indicates the frequency, and the vertical axis represents the gain. It should be noted that the frequency on the horizontal axis indicates a relative value when the Nyquist frequency is 1.

In FIG. 2, the curve h0 indicated by the one-dot-chain line represents the frequency characteristic of blurring of an image formed on a human's retina when processing for decreasing blurring (including imaging blur and hold-type blurring) is not particularly performed. That is, in the example in FIG. 1, if an image which should be input into the image processing apparatus 1 is directly supplied to a display device without being input (without being processed) into the image processing apparatus 1 and is displayed on the display device, the frequency characteristic of blurring of the image formed on the human's retina is the curve h0.

In contrast, if, for example, the display speed is doubled by high frame rate conversion processing, only hold-type blurring is decreased, and as a result, the frequency characteristic of blurring of the image formed on the human's retina becomes the curve h1 indicated by the broken line in FIG. 2. That is, if a moving picture is input into the image processing apparatus 1 and is subjected to high frame rate conversion processing by the high frame rate converter 11 and is then supplied to and displayed on a display device without being input into the imaging blur suppression processor 13 (without decreasing imaging blur), the frequency characteristic of blurring of the image formed on the retina is the curve h1.

If the display speed is doubled (if the hold-type blurring is decreased) by high frame rate conversion processing by the application of the present invention, and if the imaging blur is reduced to half, the frequency characteristic of blurring of the image formed on the human's retina becomes the curve h2 indicated by the solid line in FIG. 2. That is, if a moving picture input into the image processing apparatus 1 shown in FIG. 1 is subjected to high frame rate conversion processing by the high frame rate converter 11 and is further having imaging blur suppressed by the imaging blur suppression processor 13, and is then supplied to and displayed on a display device, the frequency characteristic of blurring of the image formed on the human's retina is the curve h2.

Upon comparing the curve h1 with the curve h2, it can be seen that high frame rate conversion processing for decreasing the hold-type blurring does not sufficiently improve the characteristic of blurring of the image formed on the human's retina, and that it is still necessary to decrease imaging blur in addition to the hold-type blurring. As stated above, however, in known methods, high frame rate conversion processing is merely performed without considering the necessity of decreasing imaging blur.

Accordingly, as in the image processing apparatus of the present invention discussed in the embodiment shown in FIG. 1, in image processing apparatuses in embodiments shown in FIGS. 12 and 13, which are discussed below, not only the high frame rate converter 11, but also the imaging blur characteristic detector 12 and the imaging blur suppression processor 13 are disposed in order to decrease imaging blur, i.e., to improve the characteristic of blurring of an image on the human's retina from the curve h0 to the curve h2 in FIG. 2. However, as in the embodiments shown in FIGS. 14 and 15, which are discussed below, the imaging blur characteristic detector 12 is not essential for the image processing apparatus of the present invention.

More specifically, the imaging blur suppression processor 13 corrects each pixel value of a subject frame based on the parameter value of the subject frame selected from the parameter values representing the characteristics of the imaging blur detected by the imaging blur characteristic detector 12, thereby improving the decreased image quality caused by imaging blur of the subject frame which are subjected to high frame rate conversion. That is, by supplying an image signal output from the image processing apparatus of the present invention, such as the image processing apparatus 1, to a display device (not shown), the display device can display a sharp image with suppressed image blurring (blurred image) as the image corresponding to the image signal.

As discussed above, it is preferable that a set of the imaging blur characteristic detector 12 and the imaging blur suppression processor 13 be combined with the high frame rate converter 11.

Image processing performed by the image processing apparatus 1 having the functional configuration shown in FIG. 1 is now described with reference to the flowchart in FIG. 3.

In step S1, the high frame rate converter 11 receives a moving picture having a first frame rate.

In step S2, the high frame rate converter 11 converts the frame rate of the moving picture into a second frame rate, which is higher than the first frame rate.

When the moving picture converted from the first frame rate into the second frame rate is supplied to the imaging blur characteristic detector 12 and the imaging blur suppression processor 13 from the high frame rate converter 11, the process proceeds to step S3.

In step S3, the imaging blur characteristic detector 12 detects at least one parameter value representing a characteristic of the imaging blur for each frame of the moving picture.

When at least one parameter value representing a characteristic of the imaging blur for each frame of the moving picture is supplied to the imaging blur suppression processor 13 from the imaging blur characteristic detector 12, the process proceeds to step S4.

In step S4, the imaging blur suppression processor 13 corrects each pixel value of each frame forming the moving picture supplied from the high frame rate converter 11 based on at least one parameter value of the subject frame selected from the parameter values detected by the imaging blur characteristic detector 12.

In step S5, the imaging blur suppression processor 13 outputs the moving picture having the corrected pixel values of each frame and converted from the first frame rate into the second frame rate.

Figure 3:
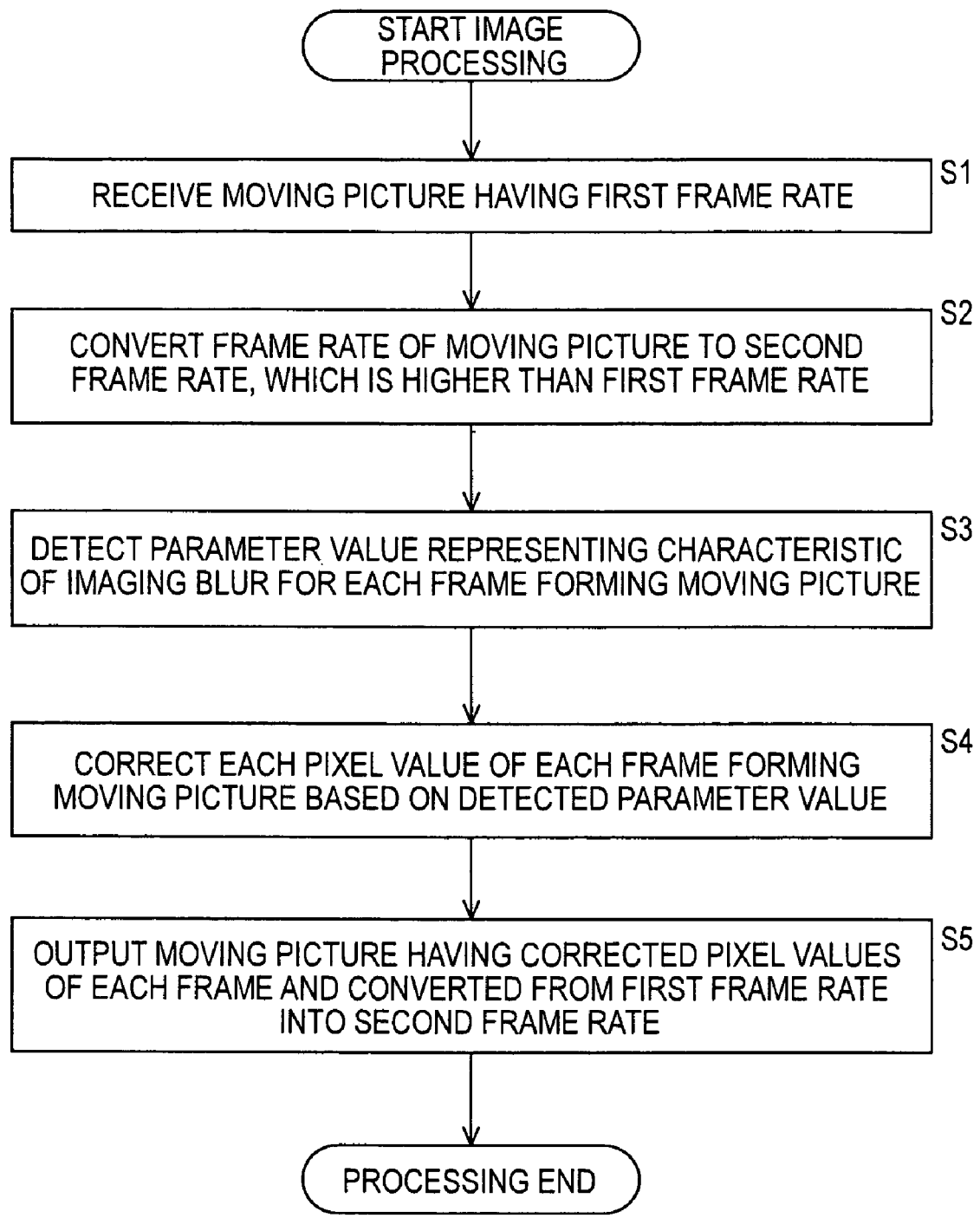
FIG. 3 is a flowchart illustrating image processing executed by the image processing apparatus shown in FIG. 1.

Then, the image processing shown in FIG. 3 is completed.

In the above discussion, for a simple description, the processing unit of processing in each of steps S1 through S5 is a moving picture. In actuality, however, it is often the case where the processing unit is a frame.

In the image processing shown in FIG. 3, the use of the moving picture as the processing unit in steps S1 through S5 means that the condition of shifting from a target step to the next step is that processing in the target step should be performed on the entire moving picture.

In contrast, in the image processing shown in FIG. 3, the use of the frame as the processing unit in steps S1 through S5 means that the condition of shifting from a target step to the next step is that processing in the target step should be performed on one entire frame. In other words, the use of the frame as the processing unit in each step means that processing from step S1 to S5 can be continuously executed on each frame, independently of (parallel with) other frames. In this case, for example, when step S3 is executed on a first frame, step S2 can be executed on a second frame, which is different from the first frame, in parallel.

In actuality, it is often the case where the pixels forming a subject frame are sequentially set as pixels to be focused (hereinafter referred to as the "focused pixels") one by one, and at least steps S3 and S4 are individually executed on the focused pixel. That is, it is often the case where the processing unit in steps S3 and S4 is a pixel.

Accordingly, in the following description, it is now assumed that the processing unit in steps S3 and S4 is a pixel. That is, step S3 is the processing performed by the imaging blur characteristic detector 12, and step S4 is the processing performed by the imaging blur suppression processor 13. Thus, in the following description, it is assumed that the processing unit of the imaging blur characteristic detector 12 and the imaging blur suppression processor 13 is a pixel.

Several modes of the imaging blur suppression processor 13 of the image processing apparatus 1 shown in FIG. 1 are described below. More specifically, for example, several modes of the imaging blur suppression processor 13 when the absolute values of motion vectors (hereinafter referred to as "moving speeds") are used as the parameters representing the characteristics of imaging blur are discussed below.

When the moving speed is used as the parameter representing a characteristic of imaging blur, the imaging blur characteristic detector 12 sequentially sets the individual pixels of each frame forming a moving picture as the focused pixels to sequentially detect the motion vectors of the individual focused pixels, and then sequentially supplies the motion vectors to the imaging blur suppression processor 13 as the parameter values representing the characteristics of the imaging blur of the focused pixels.

Accordingly, the imaging blur suppression processor 13 sequentially sets the individual pixels of each frame forming the moving picture as the focused pixels, and sequentially corrects the pixel values of the focused pixels based on the absolute values of the motion vectors of the focused pixels selected from the motion vectors supplied from the imaging blur characteristic detector 12, i.e., based on the motion speeds of the focused pixels.

The reason why the moving speed can be used as the parameter representing a characteristic of imaging blur is discussed below.

Generally, the characteristic of imaging blur can be represented by a mode dependent on the moving speed of an object.

The moving speed of an object includes the moving speed of the object (image) in a frame when the object is photographed by a camera while the object is moving and the camera is fixed in a real space. The moving speed of an object discussed here also includes the relative moving speeds of the object (image) in a frame when the object is photographed by a camera while the object is fixed and the camera is moving due to the movement of the hands in a real space or while both the object and the camera are moving in a real space.

Accordingly, the characteristic of imaging blur can be represented by a mode dependent on the moving speed of each pixel forming an object image.

The moving speed of a focused pixel indicates the spatial distance between the pixel in a subject frame and the corresponding pixel (corresponding point) in a previous frame. For example, if the spatial distance between the pixel in a subject frame and the corresponding pixel (corresponding point) in the previous frame (temporally one frame before) is K (K is an integer of 0 or greater) pixels, the moving speed of that pixel is K [pixel/frame].

In this case, if a predetermined pixel forming an object image is set as the focused pixel, the characteristic of imaging blur of the focused pixel can be represented by a mode dependent on the magnitude of the moving speed K [pixel/frame] of the focused pixel.

Figure 4:
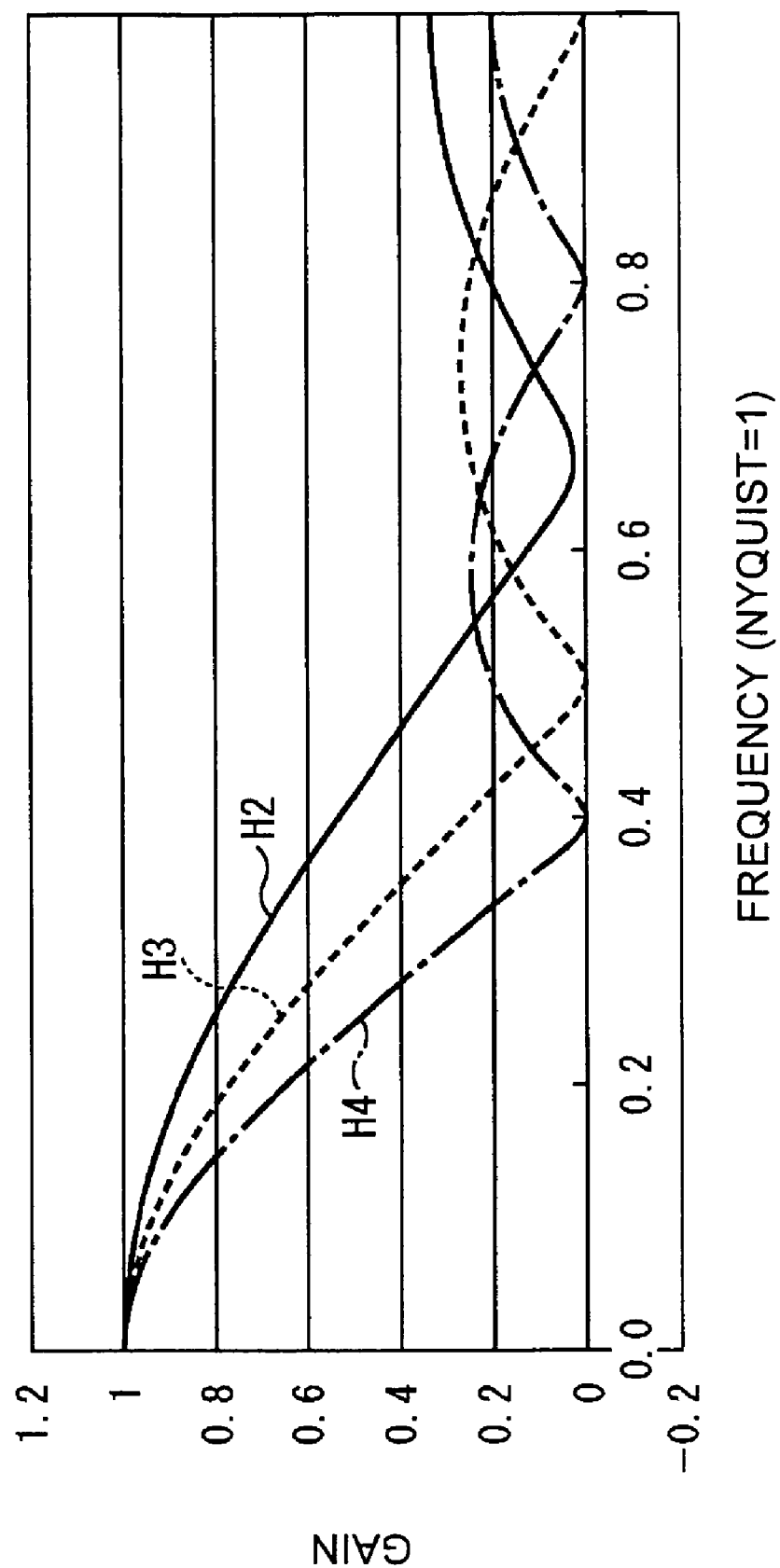
FIG. 4 illustrates the frequency characteristics of imaging blur in accordance with a motion vector (moving speed).

More specifically, when the moving speeds of the focused pixel are 2, 3, and 4 [pixel/frame], the frequency characteristics of imaging blur of the focused pixel are H2 through H4, respectively, shown in FIG. 4.

That is, FIG. 4 shows the frequency characteristics of imaging blur of the focused pixel when the moving speeds of the focused pixel are 2, 3, and 4 [pixel/frame]. In FIG. 4, the horizontal axis indicates the frequency, and the vertical axis represents the gain. It should be noted that the frequency on the horizontal axis indicates a relative value when the Nyquist frequency is 1.

The reason why the moving speed can be used as the parameter representing a characteristic of imaging blur has been discussed above.

The frequency characteristics H2 through H4 shown in FIG. 4 reveal that the characteristics of the imaging blur of a focused pixel in the spatial domain can be represented by a moving average filter (low-pass filter).

More specifically, when the transfer function (hereinafter referred to as the "imaging-blur transfer function") representing the moving average filter (low-pass filter) is indicated by G, and when the ideal image signal without imaging blur (hereinafter referred to as the "signal before the occurrence of imaging blur") is indicated by F in the frequency domain, and when the actual image signal output from a camera, i.e., the image signal with imaging blur (hereinafter referred to as the "image signal after the occurrence of imaging blur"), is indicated by H in the frequency domain, the signal after the occurrence of imaging blur can be expressed by the following equation (1).

$$G = H \times F \quad (1)$$

The object of the present invention is to remove (suppress) imaging blur, and thus, to achieve the object of the present invention, the signal F before the occurrence of imaging blur is predicted by calculation from the known signal G after the occurrence of imaging blur and the known imaging-blur transfer function H. That is, the predictive calculation is conducted according to the following equation (2).

$$F = \mathrm{inv}(H) \times G \quad (2)$$

In equation (2), inv(H) designates the inverse function of the transfer function H. Since the imaging-blur transfer function H has the characteristic of a low-pass filter, as stated above, the inverse function inv(H) has the characteristic of a high-pass filter.

Also, as stated above, the characteristic of the imaging-blur transfer function H changes in accordance with the moving speed. More specifically, for example, when the moving speeds of a focused pixel are 2, 3, and 4 [pixel/frame], the frequency characteristics of the imaging-blur transfer function H of the focused pixel are different, as indicated by the curves H2, H3, and H4 shown in FIG. 4.

Accordingly, the imaging blur suppression processor 13 changes the property of the imaging-blur transfer function H in accordance with the moving speed to determine the inverse function inv(H) of the changed transfer function H, and performs calculation expressed by equation (2) by using the inverse function inv(H), thereby achieving the object of the present invention, i.e., the object of removing (suppressing) imaging blur.

Alternatively, since the calculation in equation (2) is the calculation in the frequency domain, the imaging blur suppression processor 13 may perform processing in the spatial domain equivalent to the calculation expressed by equation (2) to achieve the object of the present invention. More specifically, the imaging blur suppression processor 13 may execute the following first processing through third processing.

The first processing is processing for converting the characteristic of the moving average filter (low-pass filter) representing the imaging blur of a focused pixel in accordance with the moving speed of the focused pixel supplied from the imaging blur characteristic detector 12. More specifically, in the first processing, for example, a moving average filter is prepared for each of a plurality of moving speeds, and the moving average filter corresponding to the moving speed of the focused pixel is selected from the plurality of moving average filters.

The second processing consists of the following processing 2-1 through processing 2-3.

The processing 2-1 is processing for conducting Fourier transform on the moving average filter whose characteristic has been changed by the first processing to indicate the moving average filter by the frequency. More specifically, obtaining the curve H2, the curve H3, and the curve H4 shown in FIG. 4 when the moving speeds of the focused pixel are 2, 3, and 4 [pixel/frame] is the processing 2-1. That is, considering in the frequency domain, the processing for determining the imaging-blur transfer function H of the focused pixel is the processing 2-1.

The processing 2-2 is processing for calculating the reciprocal of the moving average filter represented by the frequency in the processing 2-1. That is, considering in the frequency domain, the processing for generating the inverse function inv(H) of the imaging-blur transfer function H, as indicated in equation (2), is the processing 2-2.

The processing 2-3 is processing for conducting Fourier transform on the reciprocal of the moving average filter represented by the frequency calculated in the processing 2-2. That is, the processing for generating a high-pass filter (such as a Wiener filter) corresponding to the inverse function inv (H) is the processing 2-3. In other words, processing for generating the inverse filter of the moving average filter is the processing 2-3. The high-pass filter generated by the processing 2-3 is hereinafter referred to as the "inverse moving average filter".

The third processing is as follows. An image signal g in the spatial domain corresponding to the signal G after the occurrence of imaging blur in the frequency domain in equation (2) is input as the input image, and the inverse moving average filter generated by the processing 2-3 is applied to the image signal g. By this third processing, the image signal f in the spatial domain corresponding to the signal F before the occurrence of imaging blur in the frequency domain in equation (2) can be reconstructed (predicted). More specifically, processing for correcting the pixel value of a focused pixel by applying the inverse moving average filter to a predetermined block containing the focused pixel of a subject frame is the third processing.

Figure 5:
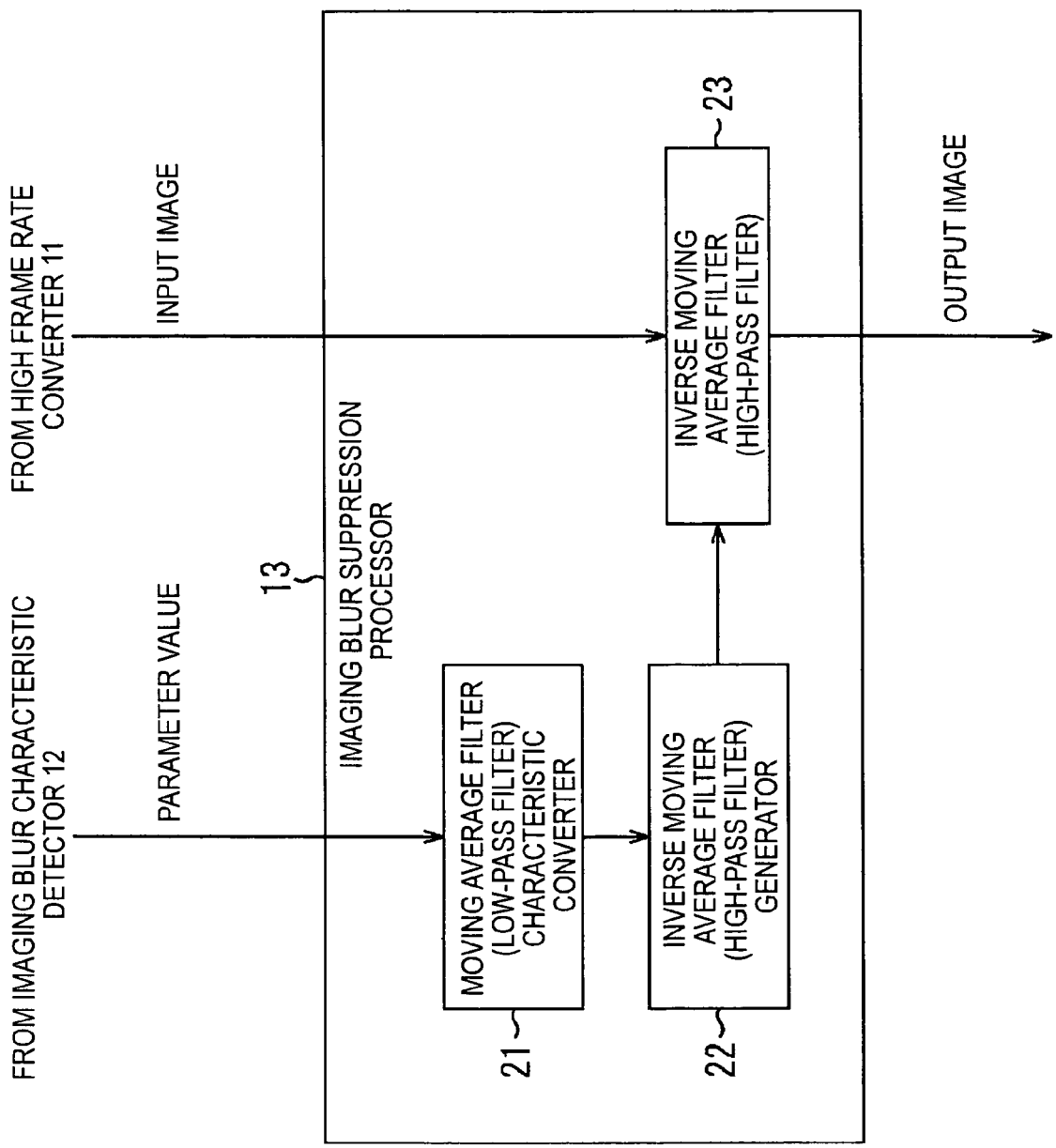
FIG. 5 is a block diagram illustrating an example of the functional configuration of an imaging blur suppression processor of the image processing apparatus shown in FIG. 1.

An embodiment of the functional configuration of the imaging blur suppression processor 13 that can execute the first processing through the third processing is shown in FIG. 5. That is, FIG. 5 illustrates an embodiment of the functional configuration of the imaging blur suppression processor 13.

The imaging blur suppression processor 13 shown in FIG. 5 includes a moving average filter (low-pass filter) characteristic converter 21, an inverse moving average filter (high-pass filter) generator 22, and an inverse moving average filter (high-pass filter) 23.

The moving average filter characteristic converter 21 executes the above-described first processing. The inverse moving average filter generator 22 executes the above-described second processing. The inverse moving average filter 23 executes the above-described third processing.

However, if the imaging blur suppression processor 13 is configured, as shown in FIG. 5, a new problem arises. That is, as indicated by the frequency characteristics H2 through H4 shown in FIG. 4, the moving average filter (frequency characteristics thereof) representing the imaging blur includes the frequency having a gain of 0. Accordingly, it is difficult for the inverse moving average filter generator 22 to generate the perfect inverse filter (perfect inverse moving average filter) of the moving average filter.

It can be said that the processing of the inverse moving average filter 23 shown in FIG. 5, that is, the processing for applying the inverse moving average filter (high-pass filter) to the input image, is to raise the gain which has been attenuated by the low-pass filter representing the imaging blur in the corresponding frequency band of the frequency characteristics of the input image.

Figure 6:
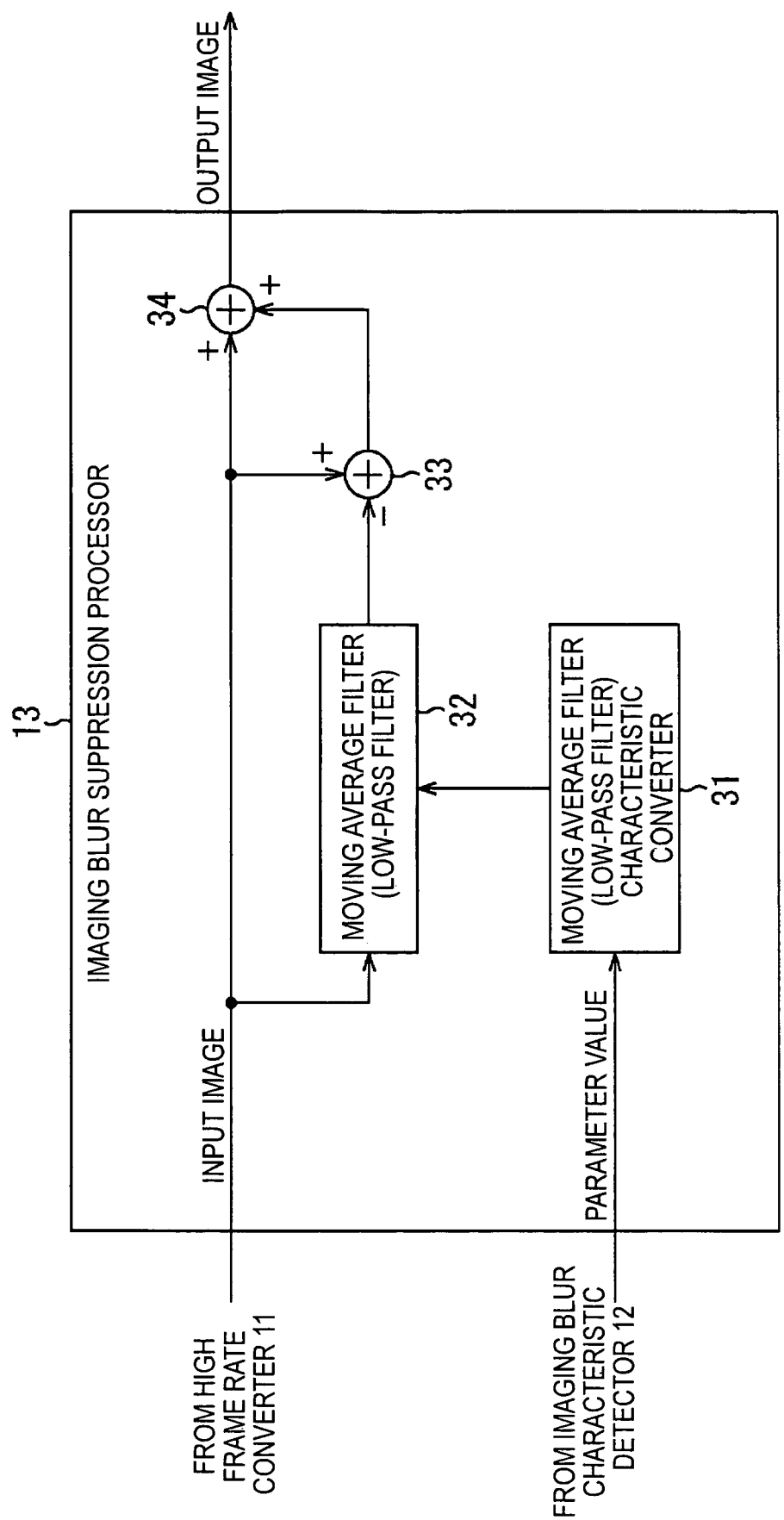
FIG. 6 is a block diagram illustrating an example of the functional configuration of the imaging blur suppression processor of the image processing apparatus shown in FIG. 1, which is different from that shown in FIG. 5.

To solve the new problem, instead of using the imaging blur suppression processor 13 configured as shown in FIG. 5, the imaging blur suppression processor 13 having the function of raising the gain attenuated in the corresponding frequency band should be used. More specifically, for example, the imaging blur suppression processor 13 configured as shown in FIG. 6 can be used. That is, the functional configuration of the imaging blur suppression processor 13 shown in FIG. 6 is different from that in FIG. 5.

In other words, to fulfill this function, the imaging blur suppression processor 13 shown in FIG. 6 is provided with a moving average filter (low-pass filter) characteristic converter 31, a moving average filter (low-pass filter) 32, a subtractor 33, and an adder 34.

Basically, the moving average filter characteristic converter 31 has the function and configuration similar to those of the moving average filter characteristic converter 21 shown in FIG. 5. That is, the moving average filter characteristic converter 31 converts the property of the moving average filter (low-pass filter) representing the imaging blur in accordance with the moving speed of a focused pixel in a subject frame (input image). In FIG. 6, the moving speed is indicated by the parameter value supplied from the imaging blur characteristic detector 12. That is, the moving speed is supplied from the imaging blur characteristic detector 12.

The average moving filter 32 (low-pass filter 32) corrects the pixel value of a focused pixel by applying the moving average filter having the property changed by the moving average filter characteristic converter 31 to a predetermined block containing the focused pixel in a subject frame (input image). The pixel value of the focused pixel corrected by the moving average filter 32 is supplied to the subtractor 33.

That is, the pixel value is input into the subtractor 33 after inverting the polarity of the pixel value of the focused pixel corrected by the average moving filter 32. The pixel value of the focused pixel of the subject frame (input image) before being corrected is also input into the subtractor 33.

Accordingly, the subtractor 33 determines the difference between the pixel value of the focused pixel before being corrected and the pixel value of the focused pixel corrected by the moving average filter 32 and supplies the difference value to the adder 34. The output of the adder 33 is hereinafter referred to as the "difference between before and after the moving average filter".

In this manner, the difference between before and after the moving average filter is input into the adder 34. The pixel value of the focused pixel of the subject frame (input image) before being corrected is also input into the adder 34.

Then, the adder 34 adds the difference between before and after the moving average filter to the pixel value of the focused pixel before being corrected as the correction value, and outputs the addition result as the output image (or part of the output image). That is, the output image is a frame formed of the corrected pixel values or a moving picture formed of such frames.

In summary, the imaging blur suppression processor 13 shown in FIG. 6 corrects each pixel value of each subject frame forming a moving picture by adding the corresponding difference between before and after the moving average filter to the pixel value as the correction value.

If the processing of the imaging blur suppression processor 13 shown in FIG. 6 in the spatial domain is considered in the frequency domain, the correction of the pixels is as follows.

When considering the difference between before and after the moving average filter, which is the output signal of the adder 33, if a predetermined frequency is focused in the frequency domain, the gain of the output signal of the adder 33 is the difference between the gain of the input image signal and the gain of the input image signal to which the moving average filter is applied. The gain of the output signal of the adder 33 is hereinafter referred to as the "difference gain between before and after the moving average filter".

Accordingly, when considering the image signal output from the imaging blur suppression processor 13 (adder 34) shown in FIG. 6 in the frequency domain, if a predetermined frequency is focused in the frequency domain, the gain of the output image signal is the value obtained by adding the difference gain between before and after the moving average filter to the gain of the input image signal. That is, in each frequency, the gain of the output image signal is increased compared to the gain of the input image by an amount equal to the difference gain between before and after the moving average filter.

In other words, in the overall imaging blur suppression processor 13 shown in FIG. 6, processing basically equivalent to applying a high-pass filter is executed.

As the embodiments of the imaging blur suppression processor 13, the example shown in FIG. 5 in which a high-pass filter is applied and the example shown in FIG. 6 in which processing basically equivalent to applying a high-pass filter is executed have been discussed.

It can be said that applying a high-pass filter to an image signal is edge enhancement processing. That is, it can be said that the object of the processing performed by the imaging blur suppression processor 13 is not to enhance edges for picture drawing, but to enhance edges which become less sharp by imaging blur. Accordingly, to achieve this object, the imaging blur suppression processor 13 controls the level of edge enhancement (amount of enhancement) by utilizing the above-described relationship between the imaging blur and the moving speed (i.e., the imaging blur characteristic is dependent on the magnitude of the moving speed). That is, it can be said that the imaging blur suppression processor 13 changes the level of edge enhancement in accordance with the moving speed of edge portions (corresponding pixels). For example, in the examples shown in FIGS. 5 and 6, the imaging blur suppression processor 13 changes the level of edge enhancement by converting the property of the moving average filter (low-pass filter) representing the imaging blur in accordance with the moving speed.

The level of edge enhancement corresponds to the amount by which each pixel value is corrected.

In the present invention, therefore, it is sufficient if the imaging blur suppression processor 13 changes the correction amount (level of edge enhancement) in accordance with the moving speed of a focused pixel and adds the correction amount to the pixel value of the focused pixel before being corrected (when being input). That is, the imaging blur suppression processor 13 can be formed in various modes without being restricted to the example shown in FIG. 5 or 6.

For example, the imaging blur suppression processor 13 may include a first delay unit, a second delay unit, a correcting unit, and a delay time changing unit, which are discussed below.

When a first image signal corresponding to a pixel group (pixel group containing a focused pixel) of a subject frame in which pixels are continuously located in the direction of a motion vector is sequentially input, the first delay unit delays the first image signal by a first delay time, and outputs the resulting second image signal. The first delay time is the time required for inputting a partial signal corresponding to N pixels (N is an integer of 1 or greater) of the first image signal to the first delay unit.

Upon sequentially receiving the second image signal output from the first delay unit, the second delay unit delays the second image signal by a second delay time and outputs the resulting third image signal. The second delay time is the time required for inputting a partial signal corresponding to M pixels (M is an integer of 1 or greater including N) of the second image signal to the second delay unit.

The correcting unit determines a correction amount by utilizing the first through third signals, and adds the determined correction amount to the pixel value of the focused pixel, thereby correcting the pixel value of the focused pixel.

The delay time changing unit changes the first delay time of the first delay unit and also the second delay time of the second delay unit in accordance with the moving speed of the focused pixel supplied from the imaging blur characteristic detector 12.

If the first delay time and the second delay time are suitably changed in accordance with the moving speed of the focused pixel, the modes (waveforms) of the second signal and the third signal are accordingly changed. The correction amount determined by utilizing the first signal through the third signal is also changed in accordance with the moving speed of the focused pixel. Thus, edge portions with imaging blur can be suitably enhanced by an amount equal to the imaging blur, and as a result, in the frames after subjecting to frame rate conversion, the decreased image quality (blurred image) caused by imaging blur can be suppressed. It is thus possible to display sharp images on a display device.

Figure 7:
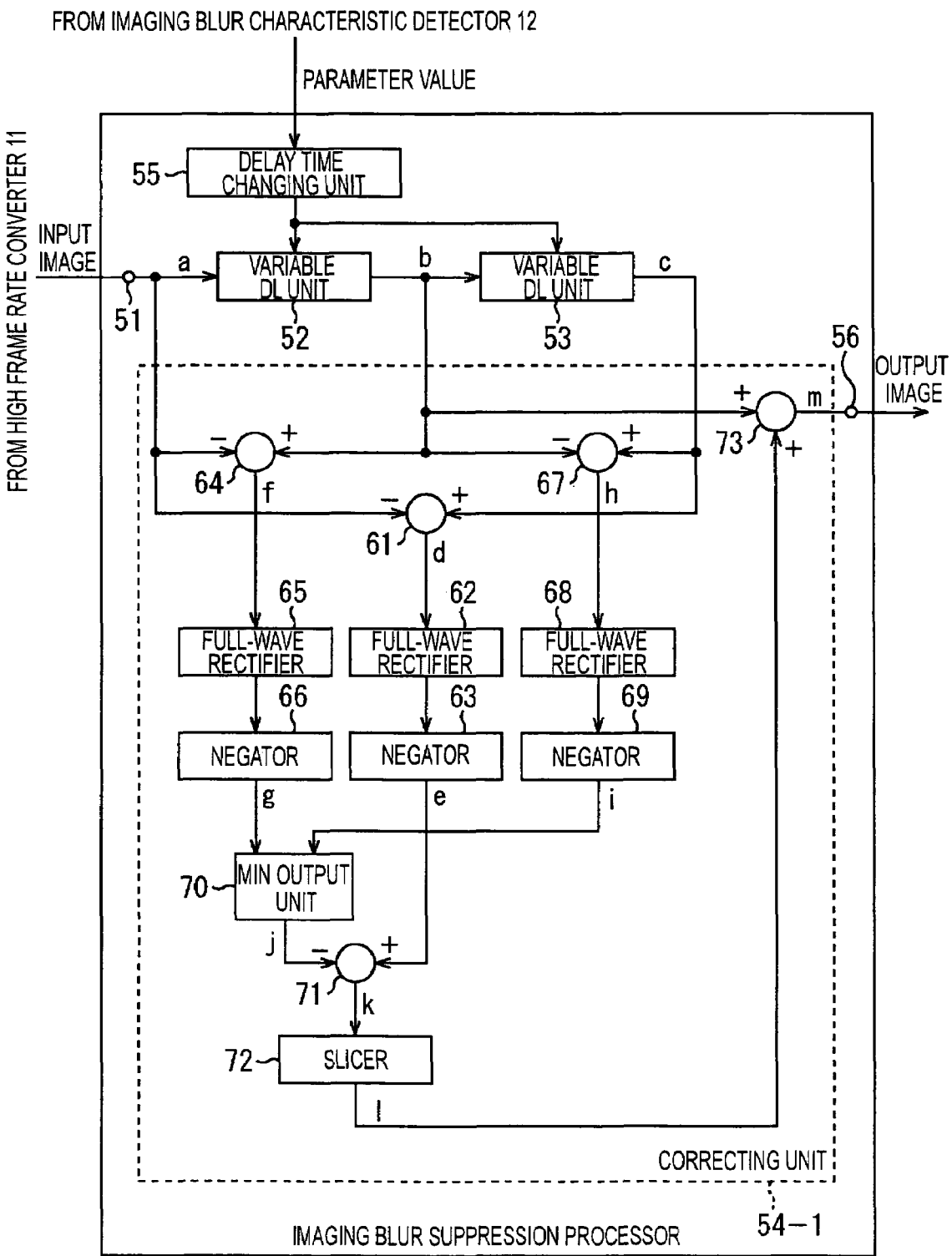
FIG. 7 is a block diagram illustrating an example of the functional configuration of the imaging blur suppression processor of the image processing apparatus shown in FIG. 1, which is different from that shown in FIG. 5 or 6.

The imaging blur suppression processor 13 including the first delay unit, the second delay unit, the correcting unit, and the delay time changing unit can be specifically configured, for example, as shown in FIG. 7. That is, FIG. 7 illustrates an embodiment of the functional configuration of the imaging blur suppression processor 13 different from that shown in FIG. 5 or 6.

The imaging blur suppression processor 13 shown in FIG. 7 includes an input unit 51, a variable DL unit 52, which serves as the first delay unit, a variable DL unit 53, which serves as the second delay unit, a correcting unit 54-1, a delay time changing unit 55, and an output unit 56; The correcting unit 54-1 includes a subtractor 61, full-wave rectifiers 62, 65, and 68, negators 63, 66, and 69, subtractors 64, 67, and 71, a MIN output unit 70, a slicer 72, and an adder 73.

The detailed configuration (connecting states of the individual blocks) and the operation of the imaging blur suppression processor 13 shown in FIG. 7 are discussed below with reference to the signals indicated in FIG. 8. That is, FIG. 8 is a timing chart illustrating examples of the output signals of the blocks of the imaging blur suppression processor 13 shown in FIG. 7.

Figure 8:
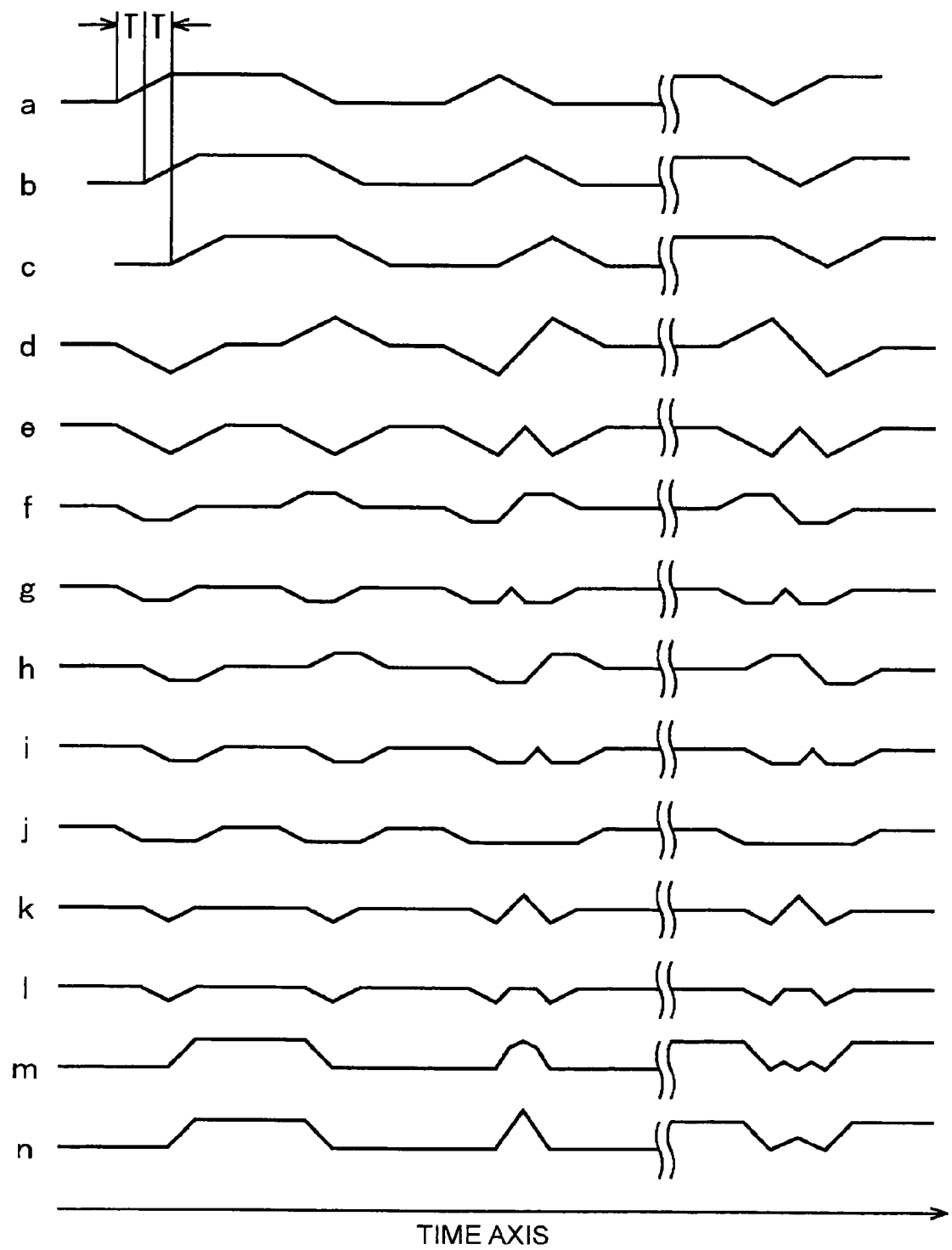
FIG. 8 is a timing chart illustrating examples of output signals of the individual elements forming the imaging blur suppression processor shown in FIG. 7.

In FIG. 7, an input image signal subjected to high frame rate conversion processing by the high frame rate converter 11, for example, signal a shown in FIG. 8, is supplied to the input unit 51. The signal a input into the input unit 51 is supplied to the variable DL unit 52. Then, a signal b shown in FIG. 8 delayed in relation to the signal a by a first delay time T is output from the DL delay unit 52. The output signal b of the variable DL unit 52 is then supplied to the variable DL unit 53. Then, a signal c shown in FIG. 8 delayed in relation to the signal b by a second delay time T, i.e., the signal c delayed in relation to the signal a by time 2T, is output from the variable DL unit 53.

The input signal a of the variable DL unit 52 and the output signal c of the variable DL unit 53 are supplied to the subtractor 61. The subtractor 61 subtracts the signal a from the signal c and supplies the resulting signal, for example, a signal d shown in FIG. 8, to the full-wave rectifier 62. The signal d is further supplied to the negator 63 that converts a positive signal to a negative signal via the full-wave rectifier 62. As a result, a signal e shown in FIG. 8 is output from the negator 63 and is supplied to the subtractor 71.

The input signal a and the output signal b of the variable DL unit 52 are supplied to the subtractor 64. The subtractor 64 subtracts the signal a from the signal b and supplies the resulting signal, for example, a signal f shown in FIG. 8, to the full-wave rectifier 65. The signal f is further converted into a signal g after passing through the full-wave rectifier 65 and the negator 66, and is then supplied to the MIN output unit 70.

The input signal b (output signal b of the variable DL unit 52) and the output signal of the variable DL unit 53 are supplied to the subtractor 67. The subtractor 67 subtracts the signal b from the signal c and supplies the resulting signal, for example, a signal h shown in FIG. 8, to the full-wave rectifier 68. The signal h is further converted into, for example, a signal i shown in FIG. 8, after passing through the full-wave rectifier 68 and the negator 69, and is then supplied to the MIN output unit 70.

The MIN (minimum value) output unit 70 extracts the smaller signal of the two signals g and i. Accordingly, for example, a signal j shown in FIG. 8, is output from the MIN output unit 70 and is supplied to the subtractor 71.

The subtractor 71 subtracts the signal j supplied from the MIN output unit 70 from the signal e supplied from the negator 63, and supplies the resulting signal, for example, a signal k shown in FIG. 8, to the slicer 72.

The signal k supplied to the slicer 72 is converted into, for example, a signal l shown in FIG. 8, and is then supplied to the adder 73.

The adder 73 adds the signal l supplied from the slicer 72 to the output signal b of the variable DL unit 52 as the correction signal, and outputs the resulting signal, for example, a signal m shown in FIG. 8, as the output image signal via the output unit 56.

In other words, in the correcting unit 54-1, by utilizing a first partial signal corresponding to a focused pixel of the image signal b input into the variable DL unit 53 after being output from the variable DL unit 52, a second partial signal which is input into the variable DL unit 52 substantially before the input time of the partial signal corresponding to the focused pixel of the image signal a into the variable DL unit 52 by the first delay time T, and a third partial signal which is output from the variable DL unit 53 substantially after the output time of the partial signal corresponding to the focused pixel of the image signal c from the variable DL unit 53 by the second delay time T, the correction amount of the level of the first partial signal (pixel value of the focused pixel) is determined. That is, the correction amount of the level of the first partial signal (pixel value of the focused pixel) is the level of a fourth partial signal corresponding to the focused pixel of the signal l output from the slicer 72 and input into the adder 73. Then, the adder 73 adds the level of the fourth partial signal (correction amount) of the signal l to the level of the first partial signal (pixel value of the focused pixel) of the signal b, thereby correcting the level of the first partial signal.

Accordingly, by suitably changing the first delay time T of the variable DL unit 52 and the second delay time T of the variable DL unit 53 in accordance with the moving speed of the focused pixel, the correction amount of the focused pixel (level of the fourth partial signal of the signal l) can be suitably changed.

In other words, the level of the above-described second partial signal of the signal a corresponds to the pixel value of a first different pixel which is located separately from the focused pixel in the direction or the direction opposite to the motion vector by N pixels which correspond to the first delay time T. Similarly, the level of the above-described third partial signal of the signal c corresponds to the pixel value of a second different pixel which is located separately from the focused pixel in the direction or the direction opposite to the motion vector by M (=N) pixels which correspond to the second delay time T.

Thus, it can be said that the level of the fourth partial signal of the signal l is the correction amount determined based on the pixel value of the focused pixel, the pixel value of the first different pixel, and the pixel value of the second different pixel. It can also be said that changing the first delay time T of the variable DL unit 52 and the second delay time T of the variable DL unit 53 in accordance with the moving speed of the focused pixel is to change the first different pixel and the second different pixel in accordance with the moving speed of the focused pixel.

As described above, by suitably changing the first different pixel and the second different pixel in accordance with the moving speed of the focused pixel, the imaging blur suppression processor 13 shown in FIG. 7 can output the signal having enhanced edges which have become less sharp than the input image (input signal a) as the output image (output signal m). Thus, portions with the decreased quality (blurred image) in each frame caused by imaging blur can be substantially recovered to the quality of the original image (without blurred image). As a result, sharp images can be displayed on a display device (not shown).

If the slicer 72 is not provided for the imaging blur suppression processor 13 shown in FIG. 7, for example, a signal n shown in FIG. 8, is output from the output unit 56 as the output image signal. In this case, the level of rising pulses becomes high, which makes images displayed on a display device (not shown) unnatural, and the center of falling pulses are recessed by a considerable amount, which makes images displayed on a display device (not shown) unnatural.

In contrast, since the imaging blur suppression processor 13 shown in FIG. 7 is provided with the slicer 72, the generation of unnatural images can be prevented.

As discussed above, the correcting unit 54-1 of the imaging blur suppression processor 13 shown in FIG. 7 conducts full-wave rectification and negation on the three subtraction signals among the subtraction signals obtained by performing subtraction on predetermined two signals of the input signals and the output signals of the variable DL unit 52 and the variable DL unit 53, and executes the predetermined calculation on the resulting three signals. Then, the correcting unit 54-1 extracts only the signal l, which consists of the negative signal components, and utilizes the signal l as the correction amount of the focused pixel. As a result, the output signal without preshoot or overshoot, for example, the output signal m shown in FIG. 8, can be obtained.

That is, the object of the present invention is to (substantially) reconstruct the image signal before the occurrence of imaging blur from the image signal after the occurrence of imaging blur. The edge portions of the image signal before the occurrence of imaging blur are without the occurrence of preshoot or overshoot. Accordingly, if the output signal of the imaging blur suppression processor 13 is with the occurrence of preshoot or overshoot, the output signal is not a signal constructed from the image signal before the occurrence of imaging blur, but a signal as a result of overcorrecting the imaging blur. The imaging blur suppression processor 13 shown in FIG. 7 outputs the output signal without the occurrence of preshoot or overshoot, i.e., the image signal closer to the image signal before the occurrence of imaging blur.

As the imaging blur suppression processor 13 including a first delay unit, a second delay unit, a correcting unit, and a delay time changing unit, the imaging blur suppression processor 13 shown in FIG. 7 has been discussed. However, the imaging blur suppression processor 13 including a first delay unit, a second delay unit, a correcting unit, and a delay time changing unit can be formed in various modes without being restricted to the example shown in FIG. 7.

Figure 9:
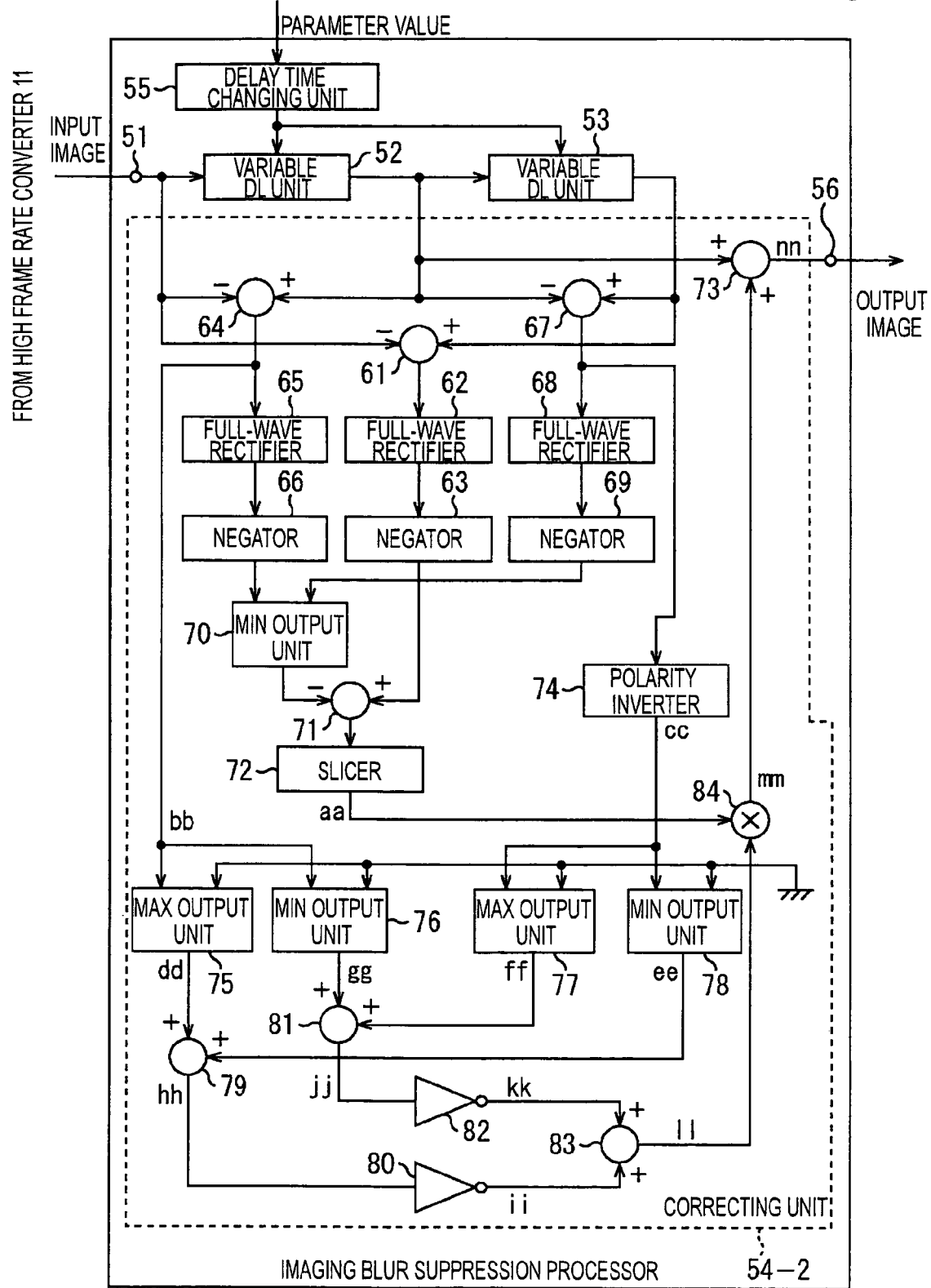
FIG. 9 is a block diagram illustrating an example of the functional configuration of the imaging blur suppression processor of the image processing apparatus shown in FIG. 1, which is different from that shown in FIG. 5, 6, or 7.

More specifically, for example, the imaging blur suppression processor 13 including a first delay unit, a second delay unit, a correcting unit, and a delay time changing unit may be configured, as shown in FIG. 9, other than the configuration shown in FIG. 7. That is, FIG. 9 illustrates an embodiment of the functional configuration of the imaging blur suppression processor 13 different from that shown in FIG. 5, 6, or 7.

In the imaging blur suppression processor 13 shown in FIG. 9, elements having the same functions and configurations as those of the imaging blur suppression processor 13 shown in FIG. 7 are designated with like reference numerals.

The imaging blur suppression processor 13 shown in FIG. 9 includes the input unit 51, the variable DL unit 52, which serves as the first delay unit, the variable DL unit 53, which serves as the second delay unit, a correcting unit 54-2, the delay time changing unit 55, and the output unit 56. The correcting unit 54-2 includes a polarity inverter 74, MAX output units 75 and 77, MIN output units 76 and 78, adders 79, 81, and 83, inverter amplifiers 80 and 82, and a multiplier 84 in addition to the subtractor 61, the full-wave rectifiers 62, 65, and 68, the negators 63, 66, and 69, the subtractors 64, 67, and 71, the MIN output unit 70, the slicer 72, and the adder 73 provided for the correcting unit 54-1 shown in FIG. 7.

That is, upon comparing the configuration in FIG. 9 with that in FIG. 7, the configuration corresponding to the input unit 51, the variable DL unit 52, the variable DL unit 53, the delay time changing unit 55, and the output unit 56, and the subtractor 61, the full-wave rectifiers 62, 65, and 68, the negators 63, 66, and 69, the subtractors 64, 67, and 71, the MIN output unit 70, the slicer 72, and the adder 73 of the correcting unit 54-2 is the same.

Figure 10:
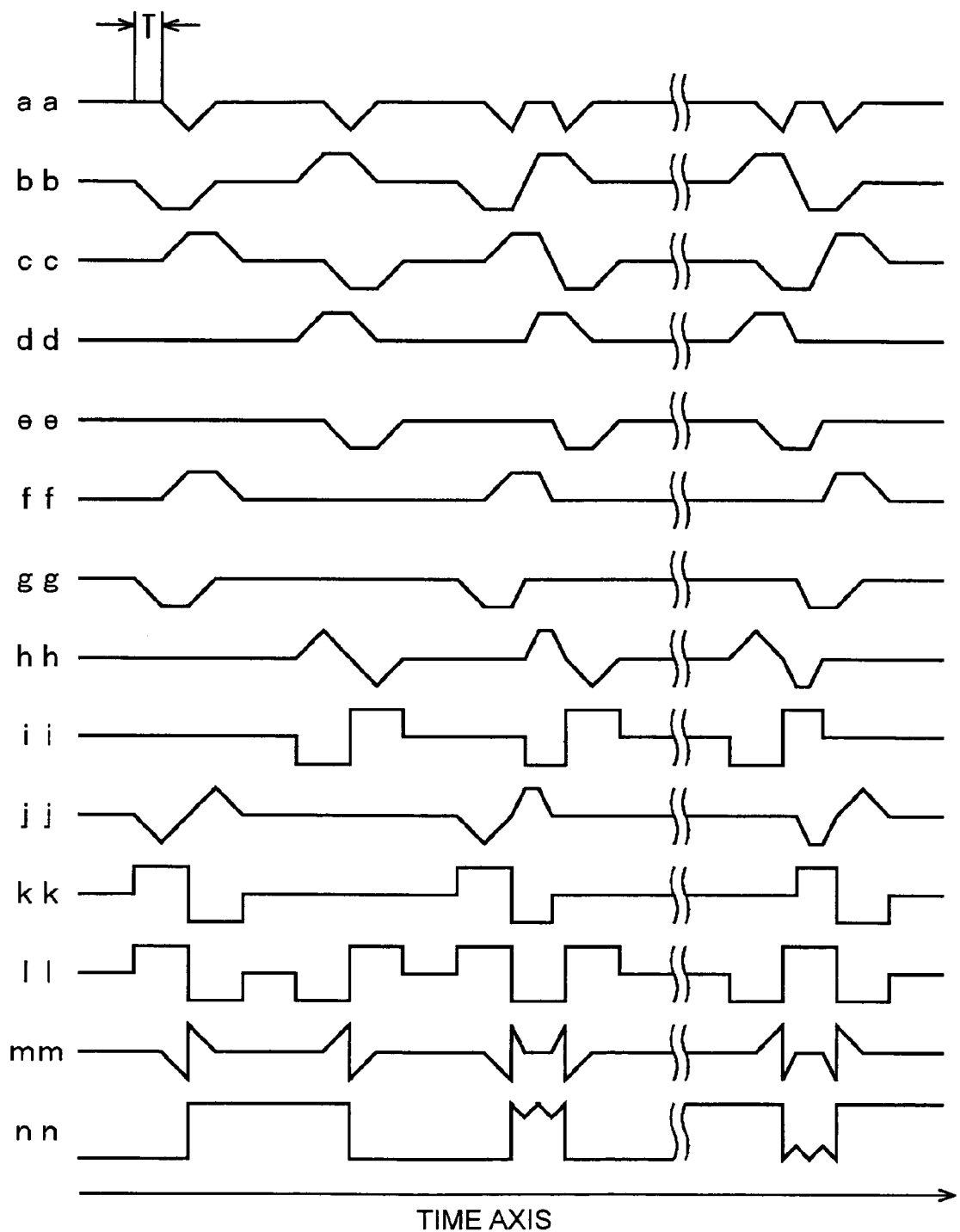
FIG. 10 is a timing chart illustrating examples of output signals of the individual elements of the imaging blur suppression processor shown in FIG. 9.

A description is now given, with reference to the signals shown in FIG. 10, of the detailed configuration (connecting state of the individual blocks) and operation of the portions of the imaging blur suppression processor 13 different from that shown in FIG. 7, i.e., the polarity inverter 74, the MAX output units 75 and 77, the MIN output units 76 and 78, the adders 79, 81, and 83, the inverter amplifiers 80 and 82, and the multiplier 84. That is, FIG. 10 is a timing chart illustrating examples of the output signals of the individual blocks of the imaging blur suppression processor 13 shown in FIG. 9 different from that shown in FIG. 7.

It is now assumed, for example, that a signal aa shown in FIG. 10, which is the same as the signal 1 in FIG. 8, is output from the slicer 72 shown in FIG. 9. However, the output signal aa of the slicer 72 is supplied to the multiplier 84 rather than to the adder 73 in FIG. 9.

In FIG. 10, to clarify the time change in the signals aa through nn, the amplitudes of the signals aa through nn including the output signal aa of the slicer 72 are doubled compared to the signals a through n including the signal 1 in FIG. 8.

The signal bb in FIG. 10, which is the same as the signal f shown in FIG. 8, is output from the subtractor 64 shown in FIG. 9. The output signal bb of the subtractor 64 is supplied, not only to the full-wave rectifier 65, but also to the MAX output unit 75 and the MIN output unit 76.

The output signal of the subtractor 67 is supplied, not only to the full-wave rectifier 68, but also to the polarity inverter 74. The polarity of the signal supplied to the polarity inverter 74 is inverted, and as a result, a signal cc shown in FIG. 10 is obtained and is supplied to the MAX output unit 77 and the MIN output unit 78.

An AC ground potential is supplied to each of the MAX output unit 75, the MIN output unit 76, the MAX output unit 77, and the MIN output unit 78.

With this configuration, a signal dd shown in FIG. 10, which is the positive portion of the output signal bb of the subtractor 64, is output from the MAX output unit 75 and is supplied to the adder 79. A signal gg shown in FIG. 10, which is the negative portion of the output signal bb of the subtractor 64, is output from the MIN output unit 76 and is supplied to the adder 81. A signal ff shown in FIG. 10, which is the positive portion of the output signal cc of the polarity inverter 74, is output from the MAX output unit 77 and is supplied to the adder 81. A signal ee shown in FIG. 10, which is the negative portion of the output signal cc of the polarity inverter 74, is output from the MIN output unit 78 and is supplied to the adder 79.

The adder 79 adds the output signal of the MAX output unit 75 and the signal ee of the MIN output unit 78 and supplies the resulting signal, for example, a signal hh shown in FIG. 10, to the inverter amplifier 80. The adder 81 adds the output signal gg of the MIN output unit 76 and the output signal ff of the MAX output unit 77 and supplies the resulting signal, for example, a signal jj shown in FIG. 10, to the inverter amplifier 82.

The inverter amplifier 80 inverts the polarity of the signal hh to shape the output signal hh of the adder 79 into a rectangular wave, and supplies the resulting signal, for example, a signal ii shown in FIG. 10, to the adder 83. Similarly, the inverter amplifier 82 inverts the polarity of the output signal jj to shape the output signal jj into a rectangular wave, and supplies the resulting signal, for example, a signal kk shown in FIG. 10, to the adder 83.

The adder 83 adds the output signal ii of the inverter amplifier 80 and the output signal kk of the inverter amplifier 82 and supplies the resulting signal, for example, a signal ll shown in FIG. 10, to the multiplier 84.

Upon receiving the output signal ll of the adder 83 and the output signal aa of the slicer 72, the multiplier 84 multiplies the signal aa by the signal ll, and outputs the resulting signal, for example, a signal mm shown in FIG. 10, in which the polarities of the gradient portions (portions where sings are changed) of the output signal aa of the slicer 72 are inverted.

Then, the output signal mm of the multiplier 84 is supplied to the adder 73 as the correction signal. The adder 73 then adds the correction signal mm to the output signal (the same signal as the signal b shown in FIG. 8) of the variable DL unit

52, and outputs the resulting signal, for example, a signal nn shown in FIG. 10, as the output image signal via the output unit 56.

As discussed above, in contrast to the imaging blur suppression processor 13 shown in FIG. 7, the imaging blur suppression processor 13 shown in FIG. 9 separates each of the subtraction signals bb and cc into a positive portion and a negative portion and conducts the predetermined computation on those signal portions to generate the rectangular wave signal 11. By using the rectangular wave signal 11, the imaging blur suppression processor 13 controls the polarity of the correction signal aa, thereby correcting the output signal to make the edges of the output signal acuter (sharper).

As the embodiments of the imaging blur suppression processor 13 of the image processing apparatus 1 shown in FIG. 1 to which the present invention is applied, the imaging blur suppression processors 13 having the functional configurations shown in FIGS. 5, 6, 7, and 9 have been discussed.

In the above-described examples, when correcting the pixel value of each pixel, the imaging blur suppression processors 13 having the aforementioned functional configurations use the moving speed (absolute value of the motion vector) as the parameter. However, another parameter representing a characteristic of imaging blur other than the moving speed may be used.

More specifically, as the parameter representing a characteristic of imaging blur, for example, the imaging blur suppression processor 13 may use the shutter speed of a camera when a subject moving picture is photographed. The reason for using the shutter speed as the parameter is that the level of imaging blur becomes different according to the difference of the shutter speed by, for example, a time Ts, as shown in FIG. 11.

Figure 11:
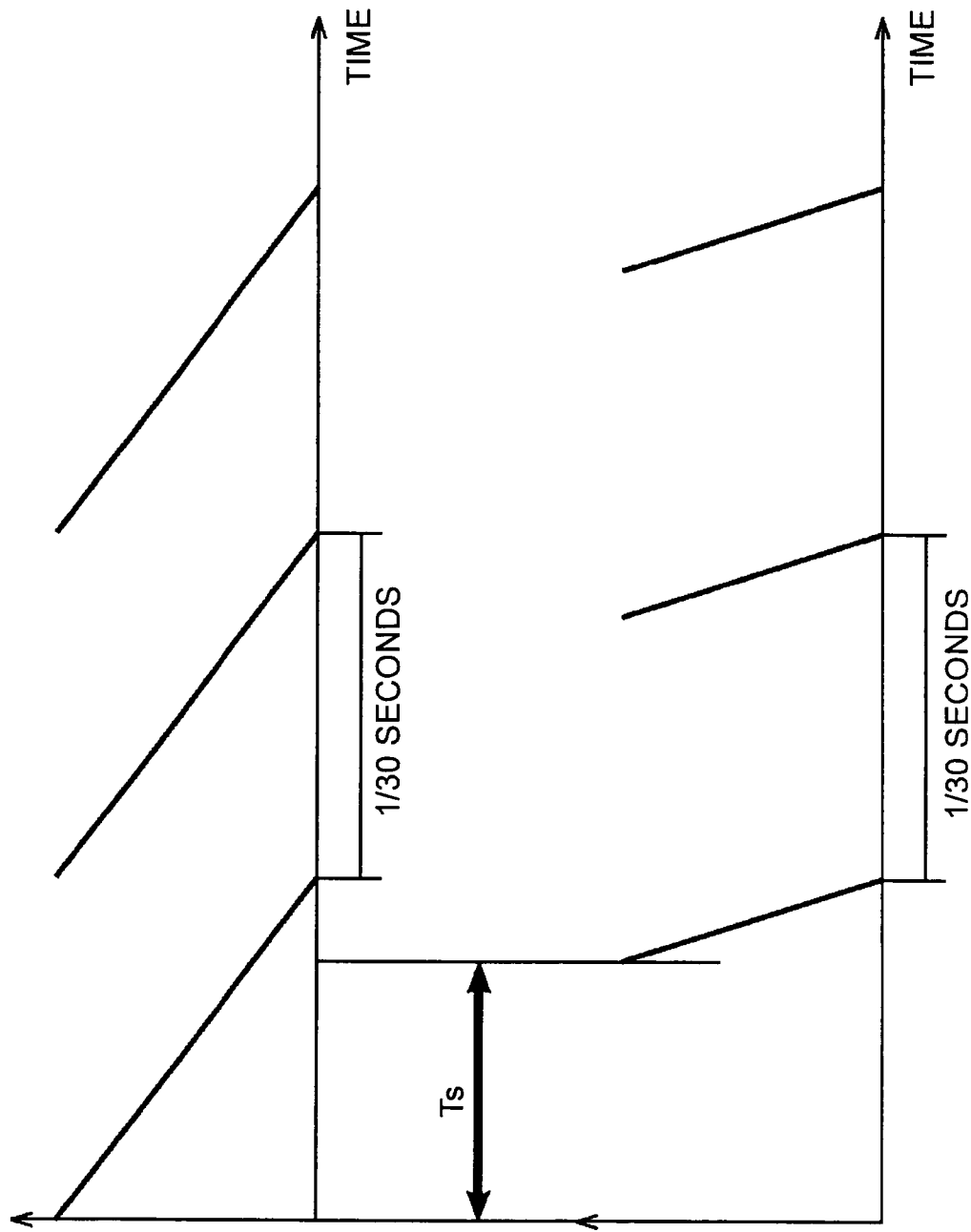
FIG. 11 illustrates the shutter speeds of a camera and imaging blur characteristics.

That is, the upper part in FIG. 11 illustrates that the shutter speed is 1/30 seconds, which is the same as the frame rate, and the lower part in FIG. 11 illustrates that the shutter speed is (1/30−Ts seconds), which is faster than the frame rate. Both in the upper part and in the lower part of FIG. 11, the horizontal axis represents the time axis, and the vertical axis indicates the proportion of the shutter opening time. The proportion of the shutter opening time is the proportion represented by (Ta/V)×100 [%] when the shutter speed is V [seconds] (V is a certain value of 0 or greater), when the proportion of the shutter opening time at a first time when the shutter is opened is 0%, when the proportion of the shutter opening time at a second time when the shutter is shut after the lapse of V [seconds] from the first time is 100%, and when the period from the first time to the current time is Ta [seconds] (Ta is a certain positive value in a range of 0 to V). In this case, in the vertical axis both of the upper part and the lower part in FIG. 11, the points of the vertical axis contacting the time axis are 100 [%], and the maximum values (highest values in each straight line) of the vertical axis are 0 [%]. That is, in the vertical axis both of the upper part and the lower part in FIG. 11, the proportion of the shutter opening time becomes greater as further downward in the vertical axis.

It is now assumed that one sensing element of the camera corresponds to one pixel in a frame. In this case, when the shutter speed is 1/30 seconds, as indicated by the upper part in FIG. 11, the integral value of incident light during 1/30 seconds while the shutter is being opened is output from the sensing element as the pixel value of the corresponding pixel. In contrast, when the shutter speed is (1/30−Ts) seconds, the integral value of incident light during (1/30−Ts) seconds while the shutter is being opened is output from the sensing element as the pixel value of the corresponding pixel.

More specifically, the shutter speed corresponds to the light accumulation period in a sensing element. Accordingly, if an object is moving across a predetermined sensing element in a real space, a greater quantity of light different from the light corresponding to the object, such as background light, is incident on the sensing element when the shutter speed is 1/30 seconds than that when the shutter speed is (1/30−Ts) seconds by an amount equal to the time Ts [seconds]. Thus, the accumulation value corresponding to a greater proportion of light, such as light from a background, which is different from light from the object, is mixed to the pixel value output from one sensing element when the shutter speed is 1/30 seconds than that when the shutter speed is (1/30−Ts) seconds, thereby increasing the level of imaging blur.

In summary, as the shutter speed becomes slower, the level of imaging blur becomes greater. That is, it can be said that the shutter speed represents a characteristic of imaging blur. Accordingly, as in the moving speed, the shutter speed can be used as the parameter representing a characteristic of imaging blur.

When using the shutter speed as the parameter representing a characteristic of imaging blur, the imaging blur characteristic detector 12 shown in FIG. 1 can detect the shutter speed of each frame by analyzing, for example, header information, added to a moving picture (data) supplied from the high frame rate converter 11, and supplies the detected shutter speed to the imaging blur suppression processor 13 as the parameter representing a characteristic of the imaging blur. The imaging blur suppression processor 13 can suitably correct each pixel value by executing the above-described series of processing operations by using the shutter speed instead of the moving speed. The configuration of the imaging blur suppression processor 13 when using the shutter speed can be basically similar to that of the imaging blur suppression processor 13 when using the moving speed. That is, the imaging blur suppression processor 13 having any one of the functional configuration shown in FIG. 5, 6, 7, or 9 can suitably correct each pixel value by executing the above-described series of processing operations by using the shutter speed as the parameter value.

The imaging processing apparatus 1 having the functional configuration shown in FIG. 1 has been discussed as an embodiment of the image processing apparatus to which the present invention is applied. However, the image processing apparatus can be formed in various modes without being restricted to the example shown in FIG. 1.

More specifically, for example, FIGS. 12 through 15 illustrate the functional blocks of other embodiments of the image processing apparatus to which the present invention is applied.

Figure 12:
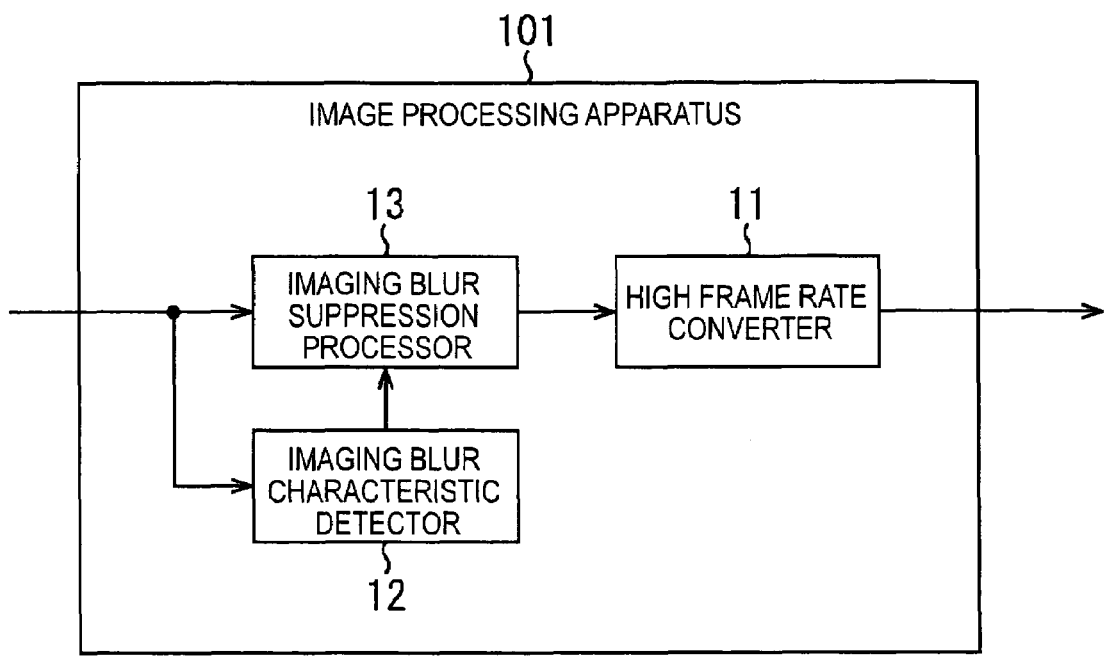
FIG. 12 is a block diagram illustrating an example of the functional configuration of the image processing apparatus to which the present invention is applied, which is different from that shown in FIG. 1.

For example, as in the image processing apparatus 1 shown in FIG. 1, an image processing apparatus 101 shown in FIG. 12 includes the high frame rate converter 11, the imaging blur characteristic detector 12, and the imaging blur suppression processor 13.

However, in the imaging processing apparatus 101 shown in FIG. 12, the imaging blur suppression processor 13 corrects a moving picture input into the image processing apparatus 101, i.e., a moving picture before subjected to high frame rate conversion performed by the high frame rate converter 11. Accordingly, the imaging blur characteristic detector 12 detects the parameter value representing a characteristic of imaging blur from the moving picture before being subjected to high frame rate conversion performed by the high frame rate converter 11, and supplies the detection result to the imaging blur suppression processor 13.

Thus, the image processing of the image processing apparatus 101 shown in FIG. 12 is performed in the order of steps S1, S3, S4, S2, and S5 of the image processing in FIG. 3.

Figure 13:
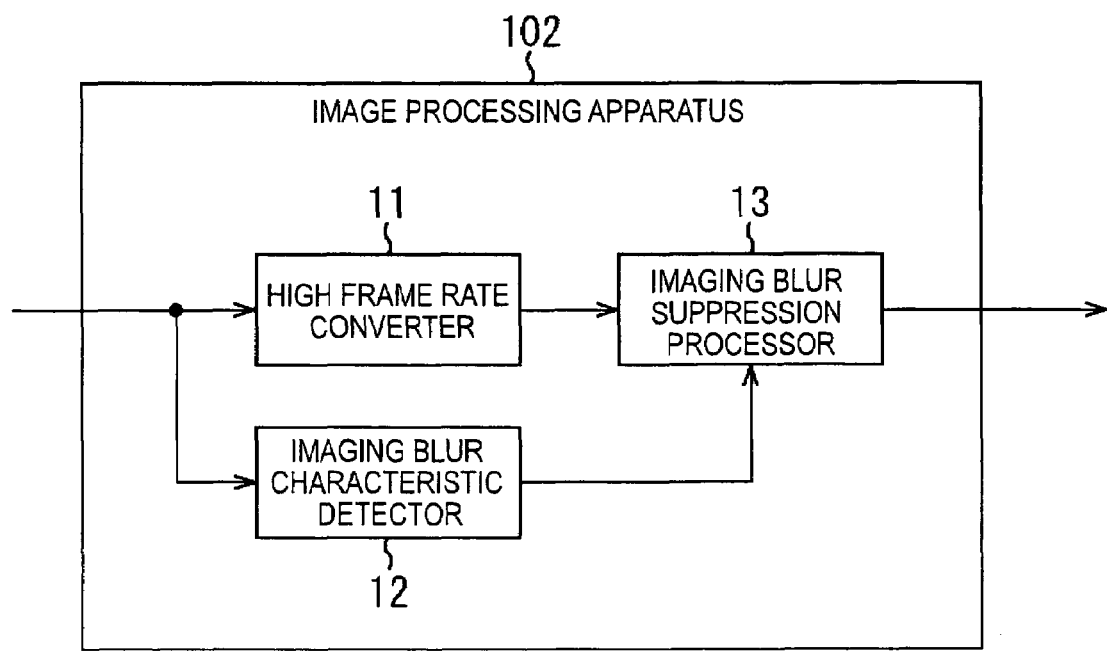
FIG. 13 is a block diagram illustrating an example of the functional configuration of the image processing apparatus to which the present invention is applied, which is different from that shown in FIG. 1 or 12.

Further, as in the image processing apparatus 1 shown in FIG. 1 or the image processing apparatus 101 shown in FIG. 12, an image processing apparatus 102 shown in FIG. 13 includes the high frame rate converter 11, the image blur characteristic detector 12, and the imaging blur suppression processor 13.

In the image processing apparatus 102 shown in FIG. 13, as in the image processing apparatus 1 shown in FIG. 1, the imaging blur suppression processor 13 corrects a moving picture obtained as a result of conducting high frame rate conversion on the input moving picture by the high frame rate converter 11. That is, the imaging blur suppression processor 13 corrects a moving picture after being subjected to high frame rate conversion.

However, the imaging blur characteristic detector 12 of the image processing apparatus 102 shown in FIG. 13 detects a parameter representing a characteristic of imaging blur from the moving picture before being subjected to high frame rate conversion performed by the high frame rate converter 11, and supplies the detection result to the imaging blur suppression processor 13. That is, the imaging blur suppression processor 13 corrects each pixel value by utilizing the parameter value detected from the moving picture before being subjected to high frame rate conversion.

As is seen from the foregoing description, the image processing of the image processing apparatus 102 shown in FIG. 13 is also performed in the order of steps S1, S2, S3, S4, and S5, as in steps of the image processing shown in FIG. 3. However, the processing in step S3 is "detect a parameter value representing a characteristic of imaging blur from the moving picture before being subjected to high frame rate conversion processing, i.e., from each frame forming the moving picture input in step S1".

Figure 14:
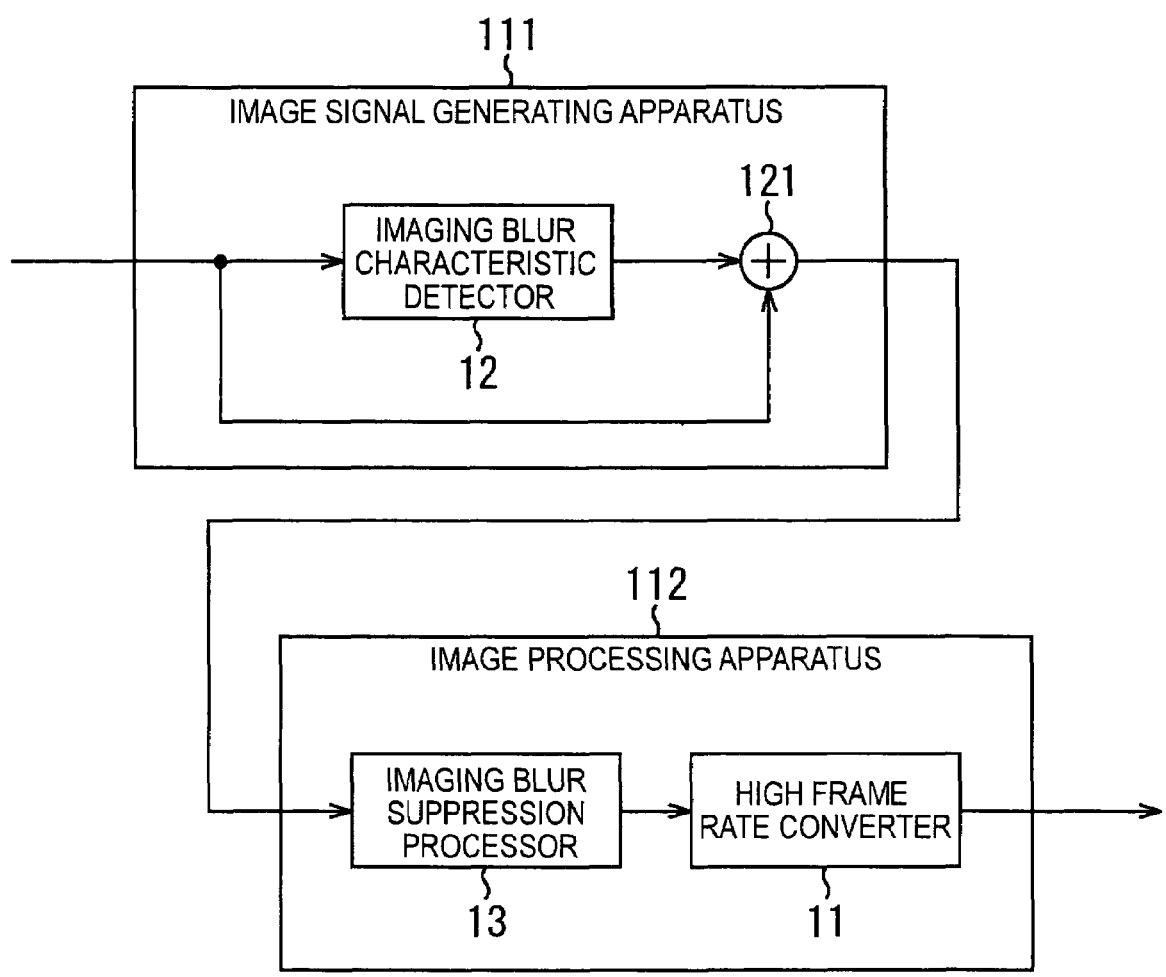
FIG. 14 is a block diagram illustrating an example of the functional configuration of the image processing apparatus to which the present invention is applied, which is different from that shown in FIG. 1, 12, or 13.
Figure 15:
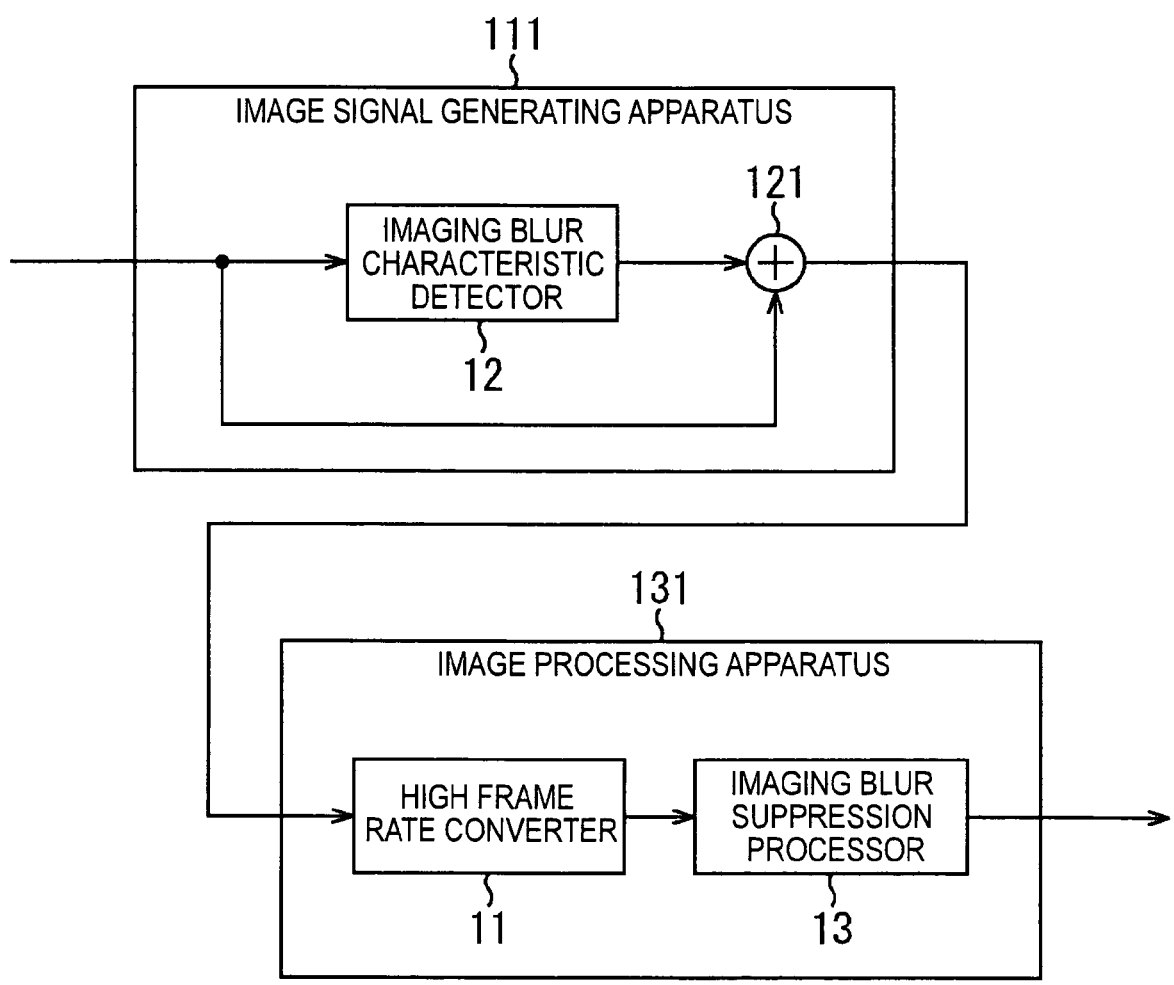
FIG. 15 is a block diagram illustrating an example of the functional configuration of the image processing apparatus to which the present invention is applied, which is different from that shown in FIG. 1, 12, 13, or 14.

In contrast to the image processing apparatus 101 shown in FIG. 12 and the image processing apparatus 102 shown in FIG. 13, an image processing apparatus 112 shown in FIG. 14 and an image processing apparatus 131 shown in FIG. 15 each include the high frame rate converter 11 and the imaging blur suppression processor 13 without the imaging blur characteristic detector 12.

As shown in FIGS. 14 and 15, the imaging blur characteristic detector 12 is disposed, together with a superimposer 121, in another image processing apparatus 111 (hereinafter referred to as the "image signal generating apparatus 111" in conjunction with FIGS. 14 and 15). A moving picture input into the image signal generating apparatus 111 is supplied to the imaging blur characteristic detector 12 and the superimposer 121. The imaging blur characteristic detector 12 detects the parameter value representing a characteristic of imaging blur from the moving picture and supplies the detected parameter value to the superimposer 121. The superimposer 121 superimposes the parameter value representing a characteristic of imaging blur on the moving picture, and outputs the resulting signal.

Accordingly, the moving picture (signal) superimposed on the parameter value representing a characteristic of imaging blur is supplied to the image processing apparatus 112 shown in FIG. 14 or the image processing apparatus 131 shown in FIG. 15 from the image signal generating apparatus 111.

Then, for example, in the image processing apparatus 112 shown in FIG. 14, the imaging blur suppression processor 13 separates the parameter value representing a characteristic of imaging blur from the moving picture, and corrects each pixel value of each frame of the separated moving picture based on the separated parameter value representing a characteristic of imaging blur.

Then, the high frame rate converter 11 conducts high frame rate conversion on the moving picture corrected by the imaging blur suppression processor 13, and outputs the resulting moving picture, i.e., the corrected moving picture having a high frame rate.

As is seen from the foregoing description, the image processing of the image processing apparatus 112 shown in FIG. 14 is performed in the order of steps S1, S4, S2, and S5 of the image processing shown in FIG. 3.

In contrast, for example, in the image processing apparatus 131 shown in FIG. 15, the high frame rate converter 11 separates the parameter value representing a characteristic of imaging blur from the moving picture to conduct high frame rate conversion on the separated moving picture, and supplies the resulting moving picture, i.e., the moving picture converted into a high frame rate, to the imaging blur suppression processor 13. In this case, the parameter value representing a characteristic of imaging blur separated from the high frame rate converter 11 is also supplied to the imaging blur suppression processor 13.

Then, the imaging blur suppression processor 13 corrects each pixel value of each frame forming the moving picture converted into a high frame rate based on the parameter value representing a characteristic of imaging blur, and outputs the resulting moving picture, i.e., the corrected moving picture having a high frame rate.

In the image processing apparatus 1 shown in FIG. 1, the image processing apparatus 101 shown in FIG. 12, the image processing apparatus 102 shown in FIG. 13, the image processing apparatus 112 shown in FIG. 14, or the image processing apparatus 131 shown in FIG. 15, the high frame rate converter 11 executes up-conversion processing by using the parameter value detected by the imaging blur characteristic detector 12. Normally, while up-conversion processing is being executed, motion-compensation frame interpolation is performed. As stated above, the imaging blur characteristic detector 12 can detect a motion vector as the parameter value. Accordingly, the high frame rate converter 11 performs motion-compensation frame interpolation processing by using the motion vector detected by the imaging blur characteristic detector 12.

The above-described series of processing operations (or part of the processing operations) can be executed by hardware or software.

Figure 16:
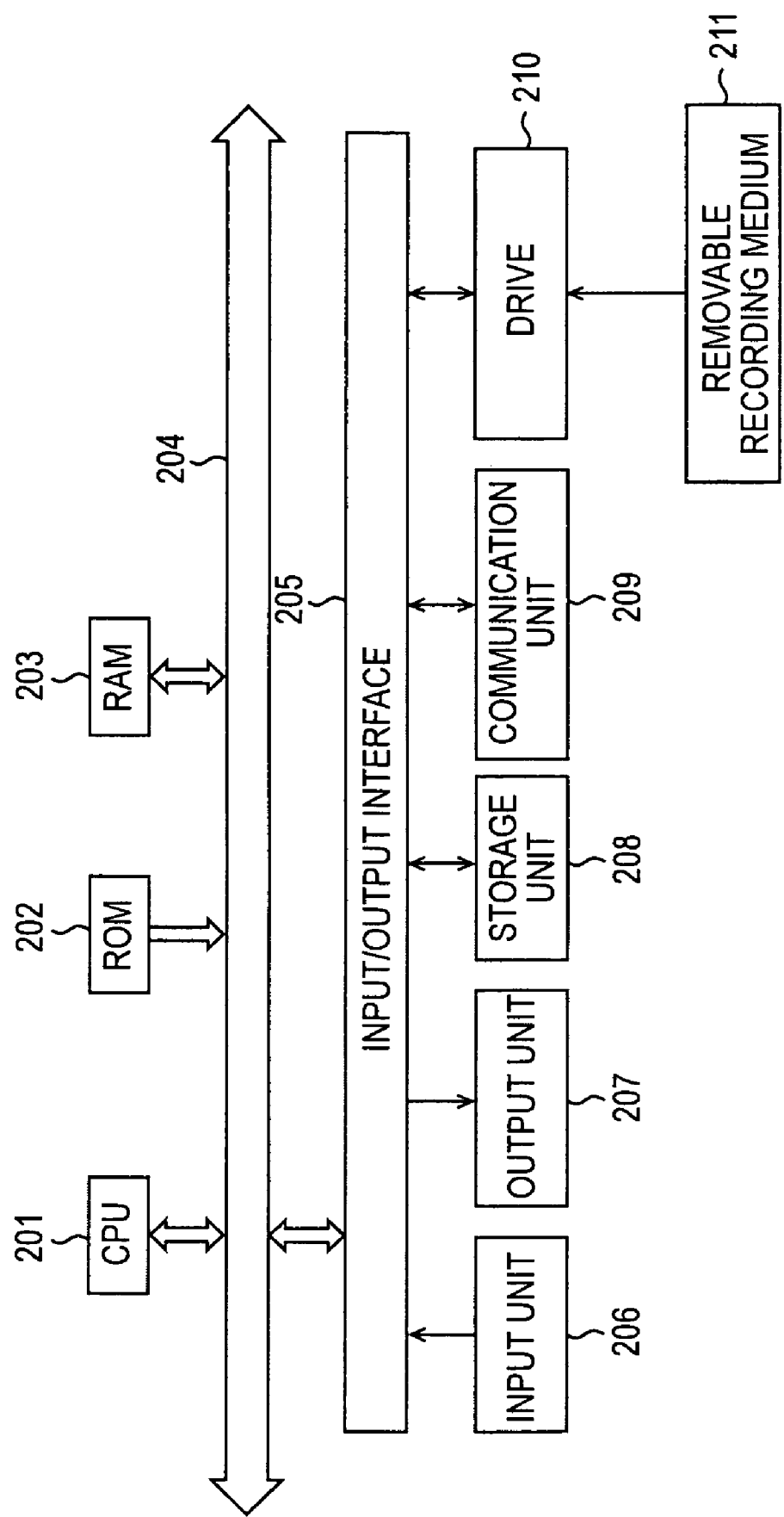
FIG. 16 is a block diagram illustrating an example of the hardware configuration of the entirety or part of the image processing apparatus to which the present invention is applied.

In this case, the entirety or part of the image processing apparatus 1 shown in FIG. 1 (for example, the imaging blur suppression processor 13), the entirety or part of the image processing apparatus 101 shown in FIG. 12, the entirety or part of the image processing apparatus 102 shown in FIG. 13, the entirety or part of the image processing apparatus 112 shown in FIG. 14, or the entirety or part of the image processing apparatus 131 shown in FIG. 15 may be formed of a computer, such as that shown in FIG. 16.

In FIG. 16, a CPU (Central Processing Unit) 201 executes various processing operations according to a program stored in a ROM (Read Only Memory) 202 or a program loaded from a storage unit 208 into a RAM (Random Access Memory) 203. In the RAM 203, data necessary for the CPU 201 to execute various processing operations is suitably stored.

The CPU 201, the ROM 202, and the RAM 203 are connected to each other via a bus 204. An input/output interface 205 is also connected to the bus 204.

The input/output interface 205 is connected to an input unit 206 including a keyboard, a mouse, etc., an output unit 207 including a display, etc., the storage unit 208 including a hard disk, etc., and a communication unit 209 including a modem, a terminal adapter, etc. The communication unit 209 performs communication with another image processing apparatus via a network including the Internet.

A drive 210 is also connected to the input/output interface 205 if necessary, and a removable recording medium 211 including a magnetic disk, an optical disc, a magneto-optical disk, or a semiconductor memory is suitably installed in the drive 210, and a computer program read from the removable recording medium 311 is installed in the storage unit 208 if necessary.

If software is used for executing a series of processing operations, a corresponding software program is installed from a network or a recording medium into a computer built into dedicated hardware or a computer, such as a general-purpose personal computer, which can execute various functions by installing various programs thereinto.

The recording medium containing the program therein may be the removable recording medium (package medium) 211 formed of a magnetic disk (including a floppy disk), an optical disc (including a CD-ROM (Compact Disk-Read Only Memory) or a DVD (Digital Versatile Disk)) a magneto-optical disk (including a MD (Mini-Disk)), or a semiconductor memory, as shown in FIG. 16, which is distributed separately from the apparatus for providing the program to the user. Alternatively, the recording medium may be the ROM 202 recording the program thereon or a hard disk contained in the storage unit 208, which is provided to the user while being integrated in the apparatus.

In this specification, steps forming the program recorded on the recording medium include processing executed in chronological order specified in the specification. Steps forming the program may also include processing executed in parallel or individually.

As discussed above, in this specification, the system represents the entire apparatus including a plurality of processing units or processors.

In the high frame rate conversion processing executed in the above-described embodiments, a desired combination of the first frame rate (frame frequency) of an input video signal and the second frame rate (frame frequency) of an output video signal may be used without being particularly restricted. More specifically, for example, the first frame rate of the input video signal may be 60 (or 30) [Hz], and the second frame rate of the output video signal may be 120 [Hz]. Alternatively, the first frame rate of the input video signal may be 60 (or 30) [Hz], and the second frame rate of the output video signal may be 240 [Hz]. Alternatively, the first frame rate of the input video signal may be 50 [Hz] compatible with the PAL (Phase Alternation by Line) system, and the second frame rate of the output video signal may be 100 [Hz] or 200 [Hz]. Alternatively, the first frame rate of the input video signal may be 48 [Hz] compatible with the telecine process, and the second frame rate of the output video signal may be 48 [Hz] or higher.

Executing the high frame rate conversion processing employed in the above-described embodiments on an input video signal of an existing television system makes it possible to display existing content with high quality.

The invention claimed is:

1. An image processing apparatus for processing a moving picture photographed by a predetermined photographing device on the basis of access units, comprising:

high rate conversion means for executing high rate conversion processing for converting a rate of the access units of the moving picture from a current first rate into a second rate, which is higher than the first rate;

detection means for detecting, for each of the plurality of access units forming the moving picture, at least one parameter value representing a characteristic of imaging blur occurring when the photographing device photographs the moving picture; and correction means for correcting, before or after the high rate conversion processing executed by the high rate conversion means, each pixel value forming each subject access unit of the moving picture based on at least one value corresponding to the subject access unit of the parameter values detected by the detection means, wherein, for each of the plurality of access units forming the moving picture, the correction means sets a subject pixel of the pixels forming the subject access unit as a focused pixel, the correction means comprising:

filter characteristic conversion means for converting a characteristic of a low-pass filter indicating the imaging blur in accordance with the value corresponding to the focused pixel of said at least one parameter value detected by the detection means;

filtering means for applying the low-pass filter whose characteristic is converted by the filter characteristic conversion means to a predetermined block containing the focused pixel of the subject access unit to output a corrected pixel value of the focused pixel as a first value;

subtraction means for computing a difference between a pixel value of the focused pixel before being corrected and the first value output from the filtering means to output the resulting difference as a second value; and addition means for adding the second value output from the subtraction means to the pixel value of the focused pixel before being corrected to output a resulting addition value as the pixel value of the focused pixel after being corrected.

2. The image processing apparatus according to claim 1, wherein the high rate conversion means executes the high rate conversion processing by using the parameter values detected by the detection means.

3. The image processing apparatus according to claim 1, wherein the first rate is the rate of the access units when the moving picture is photographed by the photographing device.

4. The image processing apparatus according to claim 1, wherein, for each of the plurality of access units forming the moving picture, the detection means detects a motion vector of at least one pixel of the pixels forming each subject access unit as the parameter value.

5. The image processing apparatus according to claim 4, wherein, as at least part of the high rate conversion processing, the high rate conversion means executes motion-compensation frame interpolation processing by using the motion vectors detected by the detection means.

6. The image processing apparatus according to claim 1, wherein the detection means detects, as the parameter value, a shutter speed of the photographing device when each of the plurality of access units forming the moving picture is photographed by the photographing device.

7. The image processing apparatus according to claim 1, wherein, for each of the plurality of access units forming the moving picture, the correction means sets a subject pixel of the pixels forming the subject access unit as a focused pixel, the correction means comprising:

filter characteristic conversion means for converting a characteristic of a low-pass filter indicating the imaging blur in accordance with the value corresponding to the focused pixel of said at least one parameter value detected by the detection means;

inverse filter generating means for generating an inverse filter of the low-pass filter whose characteristic is converted by the filter characteristic conversion means; and filtering means for correcting the pixel value of the focused pixel by applying the inverse filter generated by the inverse filter generating means to a predetermined block containing the focused pixel of the subject access unit.

8. The image processing apparatus according to claim 1, wherein:
the first rate is 30 Hz and the second rate is 120 Hz; or
the first rate is 60 Hz and the second rate is 120 Hz; or
the first rate is 60 Hz and the second rate is 240 Hz; or
the first rate is 50 Hz and the second rate is 100 Hz; or
the first rate is 50 Hz and the second rate is 200 Hz.

9. An image processing apparatus for processing a moving picture photographed by a predetermined photographing device on the basis of access units, comprising:

high rate conversion means for executing high rate conversion processing for converting a rate of the access units of the moving picture from a current first rate into a second rate, which is higher than the first rate;

detection means for detecting, for each of the plurality of access units forming the moving picture, at least one parameter value representing a characteristic of imaging blur occurring when the photographing device photographs the moving picture; and correction means for correcting, before or after the high rate conversion processing executed by the high rate conversion means, each pixel value forming each subject access unit of the moving picture based on at least one value corresponding to the subject access unit of the parameter values detected by the detection means, wherein, for each of the plurality of access units forming the moving picture, the correction means sets a subject pixel of the pixels forming the subject access unit as a focused pixel, the correction means comprising:

first delay means for sequentially receiving a first image signal corresponding to a pixel group of the subject access unit in which pixels including the focused pixel are continuously located in a predetermined direction and for delaying the received first image signal by a first delay time corresponding to N pixels (N is an integer of one or greater) to output a resulting second image signal;

second delay means for sequentially receiving the second image signal output from the first delay means and for delaying the received second image signal by a second delay time corresponding to M pixels (M is an integer of one or greater including N) to output a resulting third image signal;

pixel value correcting means for correcting the pixel value of the focused pixel by using the first image signal input into the first delay means, the second image signal output from the first delay means and input into the second delay means, and the third image signal output from the second delay means; and delay time changing means for changing the first delay time of the first delay means and the second delay time of the second delay means in accordance with a value corresponding to the focused pixel of the parameter values detected by the detection means.

10. The image processing apparatus according to claim 9, wherein the high rate conversion means executes the high rate conversion processing by using the parameter values detected by the detection means.

11. The image processing apparatus according to claim 9, wherein the first rate is the rate of the access units when the moving picture is photographed by the photographing device.

12. The image processing apparatus according to claim 9, wherein, for each of the plurality of access units forming the moving picture, the detection means detects a motion vector of at least one pixel of the pixels forming each subject access unit as the parameter value.

13. The image processing apparatus according to claim 12, wherein, as at least part of the high rate conversion processing, the high rate conversion means executes motion-compensation frame interpolation processing by using the motion vectors detected by the detection means.

14. The image processing apparatus according to claim 9, wherein the detection means detects, as the parameter value, a shutter speed of the photographing device when each of the plurality of access units forming the moving picture is photographed by the photographing device.

15. The image processing apparatus according to claim 9, wherein, for each of the plurality of access units forming the moving picture, the correction means sets a subject pixel of the pixels forming the subject access unit as a focused pixel, the correction means comprising:

filter characteristic conversion means for converting a characteristic of a low-pass filter indicating the imaging blur in accordance with the value corresponding to the focused pixel of said at least one parameter value detected by the detection means;

inverse filter generating means for generating an inverse filter of the low-pass filter whose characteristic is converted by the filter characteristic conversion means; and filtering means for correcting the pixel value of the focused pixel by applying the inverse filter generated by the inverse filter generating means to a predetermined block containing the focused pixel of the subject access unit.

16. The image processing apparatus according to claim 9, wherein:
the first rate is 30 Hz and the second rate is 120 Hz; or
the first rate is 60 Hz and the second rate is 120 Hz; or
the first rate is 60 Hz and the second rate is 240 Hz; or
the first rate is 50 Hz and the second rate is 100 Hz; or
the first rate is 50 Hz and the second rate is 200 Hz.

17. An image processing method for an image processing apparatus for processing a moving picture photographed by a predetermined photographing device on the basis of access units, the image processing method comprising:

a high rate conversion step of executing high rate conversion processing for converting a rate of the access units of the moving picture from a current first rate into a second rate, which is higher than the first rate;

a detection step of detecting, for each of the plurality of access units forming the moving picture, at least one parameter value representing a characteristic of imaging blur occurring when the photographing device photographs the moving picture; and a correction step of correcting, before or after the high rate conversion processing executed in the high rate conversion step, each pixel value forming each subject access unit of the moving picture based on at least one value corresponding to the subject access unit of the parameter values detected by processing in the detection step, wherein, for each of the plurality of access units forming the moving picture, the correction step sets a subject pixel of the pixels forming the subject access unit as a focused pixel, the steps for the focused pixel comprising:

a filter characteristic conversion step of converting a characteristic of a low-pass filter indicating the imaging blur in accordance with the value corresponding to the focused pixel of said at least one parameter value detected by processing in the detection step;

a filtering step of applying the low-pass filter whose characteristic is converted by processing in the filter characteristic conversion step to a predetermined block containing the focused pixel of the subject access unit to output a corrected pixel value of the focused pixel as a first value;

a subtraction step of computing a difference between a pixel value of the focused pixel before being corrected and the first value output as a processing result of the filtering step to output the resulting difference as a second value; and an addition step of adding the second value output as a result of a processing result of the subtraction step to the pixel value of the focused pixel before being corrected to output a resulting addition value as the pixel value of the focused pixel after being corrected.

18. The image processing method according to claim 17, wherein the high rate conversion step is the step of executing the high rate conversion processing by using the parameter values detected by processing in the detection step.

19. The image processing method according to claim 17, wherein the first rate is the rate of the access units when the moving picture is photographed by the photographing device.

20. The image processing method according to claim 17, wherein, for each of the plurality of access units forming the moving picture, the detection step includes processing for detecting a motion vector of at least one pixel of the pixels forming each subject access unit as the parameter value.

21. The image processing method according to claim 20, wherein the high rate conversion step is the step of executing motion-compensation frame interpolation processing as at least part of the high rate conversion processing by using the motion vectors detected by processing in the detection step.

22. The image processing method according to claim 17, wherein the detection step includes processing for detecting, as the parameter value, a shutter speed of the photographing device when each of the plurality of access units forming the moving picture is photographed by the photographing device.

23. The information processing method according to claim 17, wherein, for each of the plurality of access units forming the moving picture, the correction step sets a subject pixel of the pixels forming the subject access unit as a focused pixel, the steps for the focused pixel comprising:

a filter characteristic conversion step of converting a characteristic of a low-pass filter indicating the imaging blur in accordance with the value corresponding to the focused pixel of said at least one parameter value detected by processing in the detection step;

an inverse filter generating step of generating an inverse filter of the low-pass filter whose characteristic is converted by processing in the filter characteristic conversion step; and a filtering step of correcting the pixel value of the focused pixel by applying the inverse filter generated by processing in the inverse filter generating step to a predetermined block containing the focused pixel of the subject access unit.

24. The information processing method according to claim 17, wherein, for each of the plurality of access units forming the moving picture, the correction step sets a subject pixel of the pixels forming the subject access unit as a focused pixel, the steps for the focused pixel comprising:

a filter characteristic conversion step of converting a characteristic of a low-pass filter indicating the imaging blur in accordance with the value corresponding to the focused pixel of said at least one parameter value detected by processing in the detection step;

a filtering step of applying the low-pass filter whose characteristic is converted by processing in the filter characteristic conversion step to a predetermined block containing the focused pixel of the subject access unit to output a corrected pixel value of the focused pixel as a first value;

a subtraction step of computing a difference between a pixel value of the focused pixel before being corrected and the first value output as a processing result of the filtering step to output the resulting difference as a second value; and an addition step of adding the second value output as a result of a processing result of the subtraction step to the pixel value of the focused pixel before being corrected to output a resulting addition value as the pixel value of the focused pixel after being corrected.

25. The information processing apparatus according to claim 17, wherein, for each of the plurality of access units forming the moving picture, the correction step sets a subject pixel of the pixels forming the subject access unit as a focused pixel, the steps for the focused pixel comprising:

a first delay step of sequentially receiving a first image signal corresponding to a pixel group of the subject access unit in which pixels including the focused pixel are continuously located in a predetermined direction and for delaying the received first image signal by a first delay time corresponding to N pixels (N is an integer of one or greater) to output a resulting second image signal;

a second delay step of sequentially receiving the second image signal output as a processing result of the first delay step and for delaying the received second image signal by a second delay time corresponding to M pixels (M is an integer of one or greater including N) to output a resulting third image signal;

a pixel value correcting step of correcting the pixel value of the focused pixel by using the first image signal input as a subject to be processed in the first delay step, the second image signal output as the processing result of the first delay step and input as a subject to be processed in the second delay step, and the third image signal output as the processing result of the second delay step; and a delay time changing step of changing the first delay time in the first delay step and the second delay time in the second delay step in accordance with a value corresponding to the focused pixel of the parameter values detected by processing in the detection step.

26. The image processing method according to claim 17, wherein:
the first rate is 30 Hz and the second rate is 120 Hz; or
the first rate is 60 Hz and the second rate is 120 Hz; or
the first rate is 60 Hz and the second rate is 240 Hz; or
the first rate is 50 Hz and the second rate is 100 Hz; or
the first rate is 50 Hz and the second rate is 200 Hz.

27. An image Processing method for an image processing apparatus for processing a moving picture photographed by a predetermined photographing device on the basis of access units, the image processing method comprising:

a high rate conversion step of executing high rate conversion processing for converting a rate of the access units of the moving picture from a current first rate into a second rate, which is higher than the first rate;

a detection step of detecting, for each of the plurality of access units forming the moving picture, at least one parameter value representing a characteristic of imaging blur occurring when the photographing device photographs the moving picture; and a correction step of correcting, before or after the high rate conversion processing executed in the high rate conversion step, each pixel value forming each subject access unit of the moving picture based on at least one value corresponding to the subject access unit of the parameter values detected by processing in the detection step, wherein, for each of the plurality of access units forming the moving picture, the correction step sets a subject pixel of the pixels forming the subject access unit as a focused pixel, the steps for the focused pixel comprising:

a first delay step of sequentially receiving a first image signal corresponding to a pixel group of the subject access unit in which pixels including the focused pixel are continuously located in a predetermined direction and for delaying the received first image signal by a first delay time corresponding to N pixels (N is an integer of one or greater) to output a resulting second image signal;

a second delay step of sequentially receiving the second image signal output as a processing result of the first delay step and for delaying the received second image signal by a second delay time corresponding to M pixels (M is an integer of one or greater including N) to output a resulting third image signal;

a pixel value correcting step of correcting the pixel value of the focused pixel by using the first image signal input as a subject to be processed in the first delay step, the second image signal output as the processing result of the first delay step and input as a subject to be processed in the second delay step, and the third image signal output as the processing result of the second delay step; and a delay time changing step of changing the first delay time in the first delay step and the second delay time in the second delay step in accordance with a value corresponding to the focused pixel of the parameter values detected by processing in the detection step.

28. The image processing method according to claim 27, wherein the high rate conversion step is the step of executing the high rate conversion processing by using the parameter values detected by processing in the detection step.

29. The image processing method according to claim 27, wherein the first rate is the rate of the access units when the moving picture is photographed by the photographing device.

30. The image processing method according to claim 27, wherein, for each of the plurality of access units forming the moving picture, the detection step includes processing for detecting a motion vector of at least one pixel of the pixels forming each subject access unit as the parameter value.

31. The image processing method according to claim 30, wherein the high rate conversion step is the step of executing motion-compensation frame interpolation processing as at least part of the high rate conversion processing by using the motion vectors detected by processing in the detection step.

32. The image processing method according to claim 27, wherein the detection step includes processing for detecting, as the parameter value, a shutter speed of the photographing device when each of the plurality of access units forming the moving picture is photographed by the photographing device.

33. The information processing method according to claim 27, wherein, for each of the plurality of access units forming the moving picture, the correction step sets a subject pixel of the pixels forming the subject access unit as a focused pixel, the steps for the focused pixel comprising:

a filter characteristic conversion step of converting a characteristic of a low-pass filter indicating the imaging blur in accordance with the value corresponding to the focused pixel of said at least one parameter value detected by processing in the detection step;

an inverse filter generating step of generating an inverse filter of the low-pass filter whose characteristic is converted by processing in the filter characteristic conversion step; and a filtering step of correcting the pixel value of the focused pixel by applying the inverse filter generated by processing in the inverse filter generating step to a predetermined block containing the focused pixel of the subject access unit.

34. The information processing method according to claim 27, wherein, for each of the plurality of access units forming the moving picture, the correction step sets a subject pixel of the pixels forming the subject access unit as a focused pixel, the steps for the focused pixel comprising:

a filter characteristic conversion step of converting a characteristic of a low-pass filter indicating the imaging blur in accordance with the value corresponding to the focused pixel of said at least one parameter value detected by processing in the detection step;

a filtering step of applying the low-pass filter whose characteristic is converted by processing in the filter characteristic conversion step to a predetermined block containing the focused pixel of the subject access unit to output a corrected pixel value of the focused pixel as a first value;

a subtraction step of computing a difference between a pixel value of the focused pixel before being corrected and the first value output as a processing result of the filtering step to output the resulting difference as a second value; and an addition step of adding the second value output as a result of a processing result of the subtraction step to the pixel value of the focused pixel before being corrected to output a resulting addition value as the pixel value of the focused pixel after being corrected.

35. The information processing apparatus according to claim 27, wherein, for each of the plurality of access units forming the moving picture, the correction step sets a subject pixel of the pixels forming the subject access unit as a focused pixel, the steps for the focused pixel comprising:

a first delay step of sequentially receiving a first image signal corresponding to a pixel group of the subject access unit in which pixels including the focused pixel are continuously located in a predetermined direction and for delaying the received first image signal by a first delay time corresponding to N pixels (N is an integer of one or greater) to output a resulting second image signal;

a second delay step of sequentially receiving the second image signal output as a processing result of the first delay step and for delaying the received second image signal by a second delay time corresponding to M pixels (M is an integer of one or greater including N) to output a resulting third image signal;

a pixel value correcting step of correcting the pixel value of the focused pixel by using the first image signal input as a subject to be processed in the first delay step, the second image signal output as the processing result of the first delay step and input as a subject to be processed in the second delay step, and the third image signal output as the processing result of the second delay step; and a delay time changing step of changing the first delay time in the first delay step and the second delay time in the second delay step in accordance with a value corresponding to the focused pixel of the parameter values detected by processing in the detection step.

36. The image processing method according to claim 27, wherein:
the first rate is 30 Hz and the second rate is 120 Hz; or
the first rate is 60 Hz and the second rate is 120 Hz; or
the first rate is 60 Hz and the second rate is 240 Hz; or
the first rate is 50 Hz and the second rate is 100 Hz; or
the first rate is 50 Hz and the second rate is 200 Hz.

* * * * *